(12) United States Patent
Garcia

(10) Patent No.: US 12,299,605 B2
(45) Date of Patent: May 13, 2025

(54) SYSTEM AND METHOD FOR RIDE HAILING AN AUTONOMOUS VEHICLE BY A THIRD PARTY

(71) Applicant: Volkswagen Group of America Investments, LLC, Reston, VA (US)

(72) Inventor: Danson Evan Lu Garcia, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 57 days.

(21) Appl. No.: 18/102,135

(22) Filed: Jan. 27, 2023

(65) Prior Publication Data

US 2024/0256990 A1    Aug. 1, 2024

(51) Int. Cl.
| | | |
|---|---|---|
| *G06Q 10/02* | (2012.01) | |
| *G06Q 50/40* | (2024.01) | |
| *G06Q 50/47* | (2024.01) | |

(52) U.S. Cl.
CPC ............ *G06Q 10/02* (2013.01); *G06Q 50/40* (2024.01); *G06Q 50/47* (2024.01)

(58) Field of Classification Search
CPC .............................. G06Q 10/02; G06Q 50/47
USPC .......................................................... 705/5
See application file for complete search history.

(56) References Cited

U.S. PATENT DOCUMENTS

| | | | |
|---|---|---|---|
| 10,593,213 B1 | 3/2020 | Copeland et al. | |
| 10,853,629 B2 | 12/2020 | Blanc-Paques et al. | |
| 2015/0203125 A1* | 7/2015 | Penilla .................. | G07C 5/0808 |
| | | | 701/1 |
| 2018/0204399 A1* | 7/2018 | Newman .................. | G07C 9/28 |
| 2019/0318159 A1* | 10/2019 | Blanc-Paques ......... | B60R 25/25 |
| 2020/0007338 A1* | 1/2020 | Oh ......................... | H04L 9/0866 |
| 2020/0342562 A1* | 10/2020 | Lerner .................. | H04W 4/021 |

FOREIGN PATENT DOCUMENTS

| | | | | |
|---|---|---|---|---|
| EP | 3586472 B1 | * | 12/2021 | ............. G06F 21/32 |

OTHER PUBLICATIONS

Y. Song, F. Jiang, S. W. Ali Shah and R. Doss, "A New Zero-Trust Aided Smart Key Authentication Scheme in IoV," 2022 IEEE International Conference on Pervasive Computing and Communications Workshops and other Affiliated Events (PerCom Workshops), Pisa, Italy, 2022, pp. 630-636 (Year: 2022).*

* cited by examiner

*Primary Examiner* — Jeff Zimmerman
*Assistant Examiner* — Hunter A Molnar
(74) *Attorney, Agent, or Firm* — The Webb Law Firm

(57) ABSTRACT

Disclosed herein are system, method, and computer program product embodiments for ride hailing an autonomous vehicle by a third party. For example, the method includes: receiving, from a user device associated with a user account of a user for an autonomous vehicle service, (i) a request to add a rider profile associated with a rider other than the user to the user account and (ii) rider information associated with the rider; generating, based on the rider information, the rider profile; receiving, from the user device, a pick-up request associated with (i) the user account and (ii) the rider profile; assigning, based on the pick-up request, an autonomous vehicle to pick-up the rider; and providing, to the autonomous vehicle assigned to pick-up the rider, based on the rider profile, an indication of a type of identification to use to identify the rider and/or unlock the autonomous vehicle when picking-up the rider.

15 Claims, 11 Drawing Sheets

SYSTEM AND METHOD FOR RIDE HAILING AN AUTONOMOUS VEHICLE BY A THIRD PARTY

BACKGROUND

Existing ride-hailing services and taxi services may allow a person to hail a ride for another person, which may be useful in many situations, such as providing a ride to a friend and/or a family member, providing a free pick-up or drop-off to a client, and/or the like. In such scenarios, a third party user (e.g., the ride requestor), typically informs the ride-hailing service or the taxi service of the other person, a start location, a destination location, and potentially, a pick-up time. The ride-hailing service or the taxi service may provide the other person (e.g., the rider), either directly or via the ride requestor, with trip details, such as an estimated time of arrival (ETA), a type (e.g., a Volvo® sedan, etc.) and/or identifier (e.g., a license plate number, etc.) of a vehicle, contact information for a driver, and/or the like so that the rider can coordinate with the driver directly if needed. These existing ride-hailing services and taxi services may use human-to-human interactions to facilitate rider verification in third party hailer scenarios. However, an autonomous vehicle based transportation service may be operated without a human driver in the vehicle and/or without human control.

SUMMARY

According to some non-limiting embodiments or aspects, provided is a method, including: receiving, with at least one processor, from a user device associated with a user account of a user for an autonomous vehicle service. (i) a request to add a rider profile associated with a rider other than the user to the user account and (ii) rider information associated with the rider; generating, with the at least one processor, based on the rider information, the rider profile associated with the rider; receiving, with the at least one processor, from the user device associated with the user account, a pick-up request associated with (i) the user account and (ii) the rider profile associated with the rider; assigning, with the at least one processor, based on the pick-up request, an autonomous vehicle to pick-up the rider; and providing, with the at least one processor, to the autonomous vehicle assigned to pick-up the rider, based on the rider profile associated with the rider, an indication of a type of identification to use to identify the rider and/or unlock the autonomous vehicle when picking-up the rider.

In some non-limiting embodiments or aspects, the method includes receiving, with the at least one processor, from the autonomous vehicle assigned to pick-up the rider, at least one of an image of the rider, an audio recording of the rider's voice, or any combination thereof; providing, with the at least one processor, to the user device associated with the user account of the user, the at least one of an image of the rider, the audio recording of the rider's voice, or any combination thereof; receiving, with the at least one processor, from the user device associated with the user account of the user, a confirmation to unlock the autonomous vehicle for the rider; and providing, with the at least one processor, to the autonomous vehicle assigned to pick-up the rider, based on the confirmation, an unlock command to unlock a door of the autonomous vehicle.

In some non-limiting embodiments or aspects, the indication of the type of identification to use to identify the rider and/or unlock the autonomous vehicle when picking-up the rider includes an authorization for the autonomous vehicle to automatically unlock the autonomous vehicle in response to identifying the rider in an environment surrounding the autonomous vehicle without receiving user input from the user device associated with the user account of the user.

In some non-limiting embodiments or aspects, the type of identification to use to identify the rider and/or unlock the autonomous vehicle when picking-up the rider includes at least one biometric identification technique, and wherein a pair of keys including an encryption key for generating encrypted biometric information associated with the rider and a decryption key for decrypting the encrypted biometric information associated with the rider is generated by the user device.

In some non-limiting embodiments or aspects, the pair of keys is generated by the user device during the generation of the rider profile of the rider before receiving, with the at least one processor, from the user device, the pick-up request.

In some non-limiting embodiments or aspects, the pair of keys is generated by the user device based on providing, to the at least one processor, the pick-up request associated with the rider profile of the rider.

In some non-limiting embodiments or aspects, one of (i) the encrypted biometric information associated with the user and (ii) the decryption key is provided by the user device to the autonomous vehicle assigned to pick-up the user in response to the user device receiving a request for the decryption key from the autonomous vehicle.

In some non-limiting embodiments or aspects, the method further includes: obtaining, with the at least one processor, from the user device associated with the user account of the user, one of (i) the encrypted biometric information associated with the rider and (ii) the decryption key; storing, with the at least one processor, in association with the rider profile of the rider, the one of (i) the encrypted biometric information associated with the rider and (ii) the decryption key; and providing, with the at least one processor, to the autonomous vehicle assigned to pick-up the rider, the one of (i) the encrypted biometric information associated with the rider and (ii) the decryption key.

In some non-limiting embodiments or aspects, the one of (i) the encrypted biometric information associated with the rider and (ii) the decryption key is obtained by the at least one processor during generation of the rider profile of the rider before receiving, from the user device associated with the user account of the user for the autonomous vehicle service, the pick-up request associated with the rider profile of the rider.

In some non-limiting embodiments or aspects, the one of (i) the encrypted biometric information associated with the rider and (ii) the decryption key continues to be stored in association with the rider profile of the rider after the rider is picked-up by the autonomous vehicle.

In some non-limiting embodiments or aspects, the one of (i) the encrypted biometric information associated with the rider and (ii) the decryption key is obtained by the at least one processor based on receiving, from the user device associated with the user account of the user for the autonomous vehicle service, the pick-up request associated with the rider profile of the rider.

In some non-limiting embodiments or aspects, the method further includes: in response to providing, to the autonomous vehicle assigned to pick-up the rider, the one of (i) the encrypted biometric information associated with the rider and (ii) the decryption key, automatically deleting, with the at least one processor, the one of (i) the encrypted biometric information associated with the rider and (ii) the decryption key stored in association with the rider profile of the rider.

According to some non-limiting embodiments or aspects, provided is a system, including: a memory; and at least one processor coupled to the memory and configured to: receive, from a user device associated with a user account of a user for an autonomous vehicle service, (i) a request to add a rider profile associated with a rider other than the user to the user account and (ii) rider information associated with the rider; generate, based on the rider information, the rider profile associated with the rider; receive, from the user device associated with the user account, a pick-up request associated with (i) the user account and (ii) the rider profile associated with the rider; assign, based on the pick-up request, an autonomous vehicle to pick-up the rider; and provide, to the autonomous vehicle assigned to pick-up the rider, based on the rider profile associated with the rider, an indication of a type of identification to use to identify the rider and/or unlock the autonomous vehicle when picking-up the rider.

In some non-limiting embodiments or aspects, the at least one processor is further configured to receive, from the autonomous vehicle assigned to pick-up the rider, at least one of an image of the rider, an audio recording of the rider's voice, or any combination thereof; provide, to the user device associated with the user account of the user, the at least one of an image of the rider, the audio recording of the rider's voice, or any combination thereof; receive, from the user device associated with the user account of the user, a confirmation to unlock the autonomous vehicle for the rider; and provide, to the autonomous vehicle assigned to pick-up the rider, based on the confirmation, an unlock command to unlock a door of the autonomous vehicle.

In some non-limiting embodiments or aspects, the indication of the type of identification to use to identify the rider and/or unlock the autonomous vehicle when picking-up the rider includes an authorization for the autonomous vehicle to automatically unlock the autonomous vehicle in response to identifying the rider in an environment surrounding the autonomous vehicle without receiving user input from the user device associated with the user account of the user.

In some non-limiting embodiments or aspects, the type of identification to use to identify the rider and/or unlock the autonomous vehicle when picking-up the rider includes at least one biometric identification technique, and wherein a pair of keys including an encryption key for generating encrypted biometric information associated with the rider and a decryption key for decrypting the encrypted biometric information associated with the rider is generated by the user device.

In some non-limiting embodiments or aspects, the pair of keys is generated by the user device during the generation of the rider profile of the rider before receiving, with the at least one processor, from the user device, the pick-up request.

In some non-limiting embodiments or aspects, the pair of keys is generated by the user device based on providing, to the at least one processor, the pick-up request associated with the rider profile of the rider.

In some non-limiting embodiments or aspects, one of (i) the encrypted biometric information associated with the user and (ii) the decryption key is provided by the user device to the autonomous vehicle assigned to pick-up the user in response to the user device receiving a request for the decryption key from the autonomous vehicle.

In some non-limiting embodiments or aspects, the at least one processor is the at least one processor is further configured to: obtain, from the user device associated with the user account of the user, one of (i) the encrypted biometric information associated with the rider and (ii) the decryption key; store, in association with the rider profile of the rider, the one of (i) the encrypted biometric information associated with the rider and (ii) the decryption key; and provide, to the autonomous vehicle assigned to pick-up the rider, the one of (i) the encrypted biometric information associated with the rider and (ii) the decryption key.

In some non-limiting embodiments or aspects, the one of (i) the encrypted biometric information associated with the rider and (ii) the decryption key is obtained by the at least one processor during generation of the rider profile of the rider before receiving, from the user device associated with the user account of the user for the autonomous vehicle service, the pick-up request associated with the rider profile of the rider, and wherein the one of (i) the encrypted biometric information associated with the rider and (ii) the decryption key continues to be stored in association with the rider profile of the rider after the rider is picked-up by the autonomous vehicle.

In some non-limiting embodiments or aspects, the one of (i) the encrypted biometric information associated with the rider and (ii) the decryption key is obtained by the at least one processor based on receiving, from the user device associated with the user account of the user for the autonomous vehicle service, the pick-up request associated with the rider profile of the rider, and wherein the at least one processor includes: in response to providing, to the autonomous vehicle assigned to pick-up the rider, the one of (i) the encrypted biometric information associated with the rider and (ii) the decryption key, automatically delete the one of (i) the encrypted biometric information associated with the rider and (ii) the decryption key stored in association with the rider profile of the rider.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for ride hailing an autonomous vehicle by a third party. Non-limiting embodiments or aspects of the present disclosure may enable segregation of a rider role from a ride hailer or user role in an autonomous vehicle service setting, which may be useful for situations in which the rider is not able to hail an autonomous vehicle, such as the rider not having their own mobile device or user account for the autonomous vehicle service, the rider being a family member or business client of a user having a user account for the autonomous vehicle service, and/or the like. In this way, non-limiting embodiments or aspects of the present disclosure may provide for a user of an autonomous vehicle service to hail a ride for another person or rider. Additionally, or alternatively, non-limiting embodiments or aspects of the present disclosure may enable automatically unlocking autonomous vehicles assigned to pick-up the rider in response to identifying the rider in a vicinity of an autonomous vehicle using one or more identification techniques, such as a biometric identification technique, a user input-based technique, a rider input-based technique, and/or the like, thereby providing a more convenient, obvious, secure and/or inclusive approach to pick-up of the rider.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
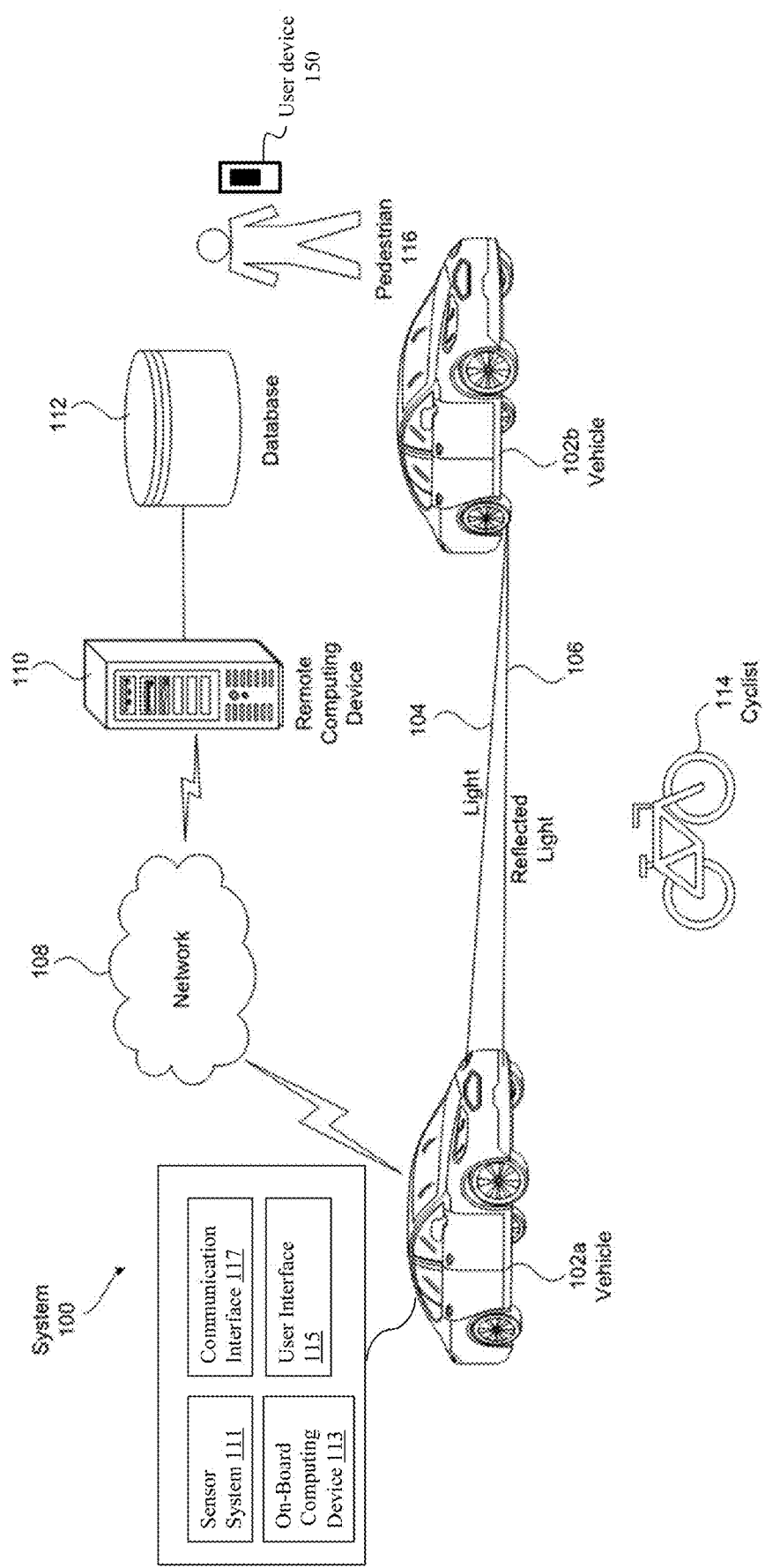
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian or user 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
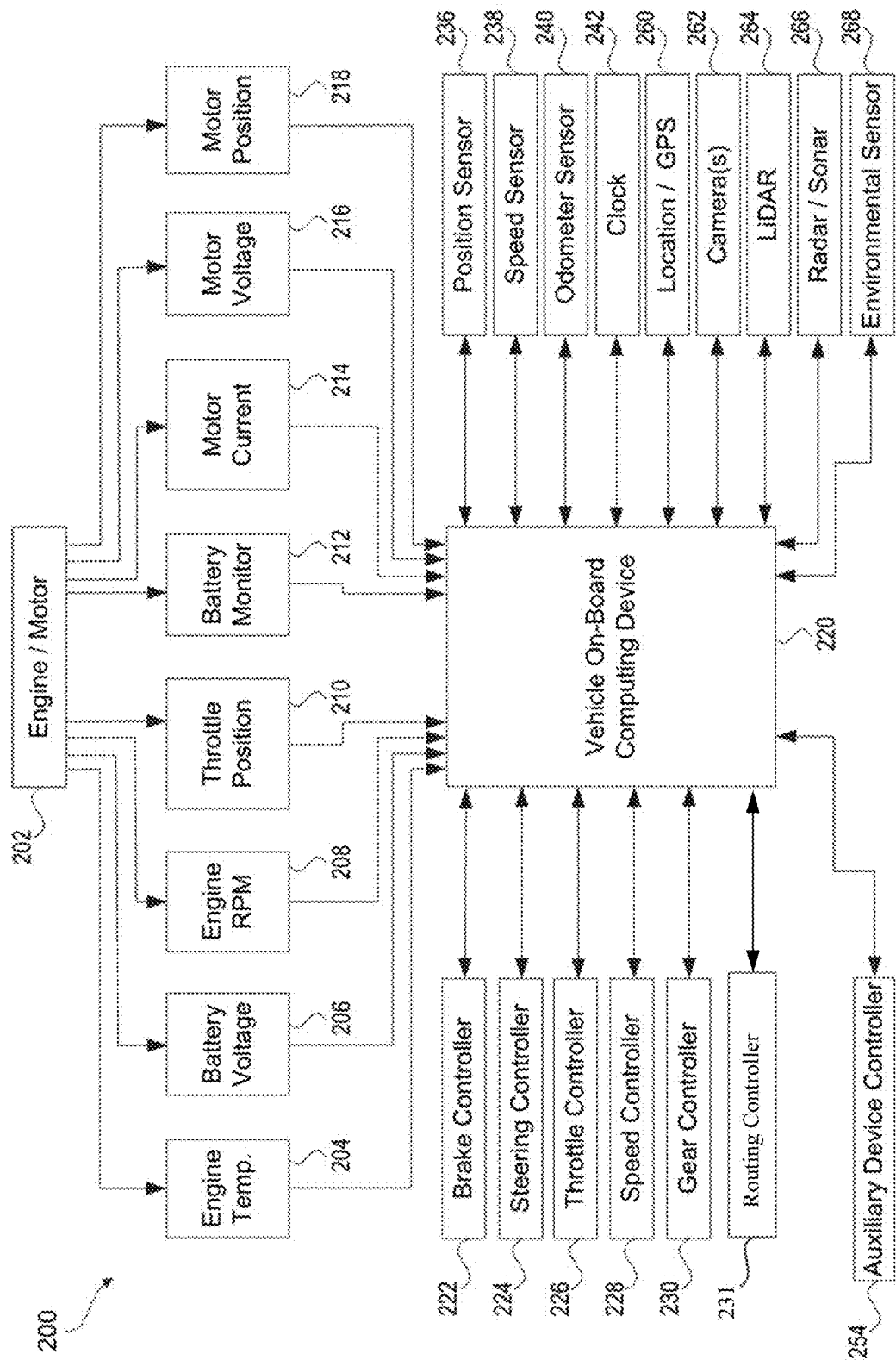
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, a fingerprint reader, or the like. The sensor data can include information that describes the location of objects within the surrounding environment of the AV 102a, information about the environment itself, information about the motion of the AV 102a, information about a route of the vehicle, information about a user or passenger of the AV 102a, or the like. As AV 102a travels over a surface, at least some of the sensors may collect data pertaining to the surface.

As will be described in greater detail, AV 102a may be configured with a LiDAR system, e.g., LiDAR system 264 of FIG. 2. The LiDAR system may be configured to transmit a light pulse 104 to detect objects located within a distance or range of distances of AV 102a. Light pulse 104 may be incident on one or more objects (e.g., AV 102b) and be reflected back to the LiDAR system. Reflected light pulse 106 incident on the LiDAR system may be processed to determine a distance of that object to AV 102a. The reflected light pulse may be detected using, in some embodiments, a photodetector or array of photodetectors positioned and configured to receive the light reflected back into the LiDAR system. LiDAR information, such as detected object data, is communicated from the LiDAR system to an on-board computing device, e.g., on-board computing device 220 of FIG. 2. The AV 102a may also communicate LiDAR data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112. Remote computing device may also be configured to communicate data/instructions to/from user device 150 over network 108.

It should be noted that the LiDAR systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

User device 150 may include one or more devices capable of receiving information and/or data from remote computing device 110 and/or AV 102a (e.g., via network 108, etc.) and/or communicating information and/or data to remote computing device 110 and/or AV 102a (e.g., via network 108, etc.). For example, user device 150 may include one or more portable electronic devices configured to communicate with one or more networks. As an example, user device 150 may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. In some non-limiting embodiments or aspects, user device 150 may be capable of receiving information (e.g., from AV 102a, etc.) via a short range wireless communication connection (e.g., a near-field communication (NFC) connection, a radio frequency identification (RFID) communication connection, a Bluetooth® communication connection, and/or the like), and/or communicating information (e.g., to AV 102a, etc.) via a short range wireless communication connection. In some non-limiting embodiments or aspects, user device 150 may include an application associated with user device 150, such as an application stored on user device 150, a mobile application (e.g., a mobile device application, a native application for a mobile device, a mobile cloud application for a mobile device, an autonomous vehicle service application, a rideshare application, and/or the like) stored and/or executed on user device 150. In some non-limiting embodiments or aspects, user device 150 may be implemented using the computer system of FIG. 10.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a LiDAR system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may implemented using the computer system of FIG. 10. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, and mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., LiDAR or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
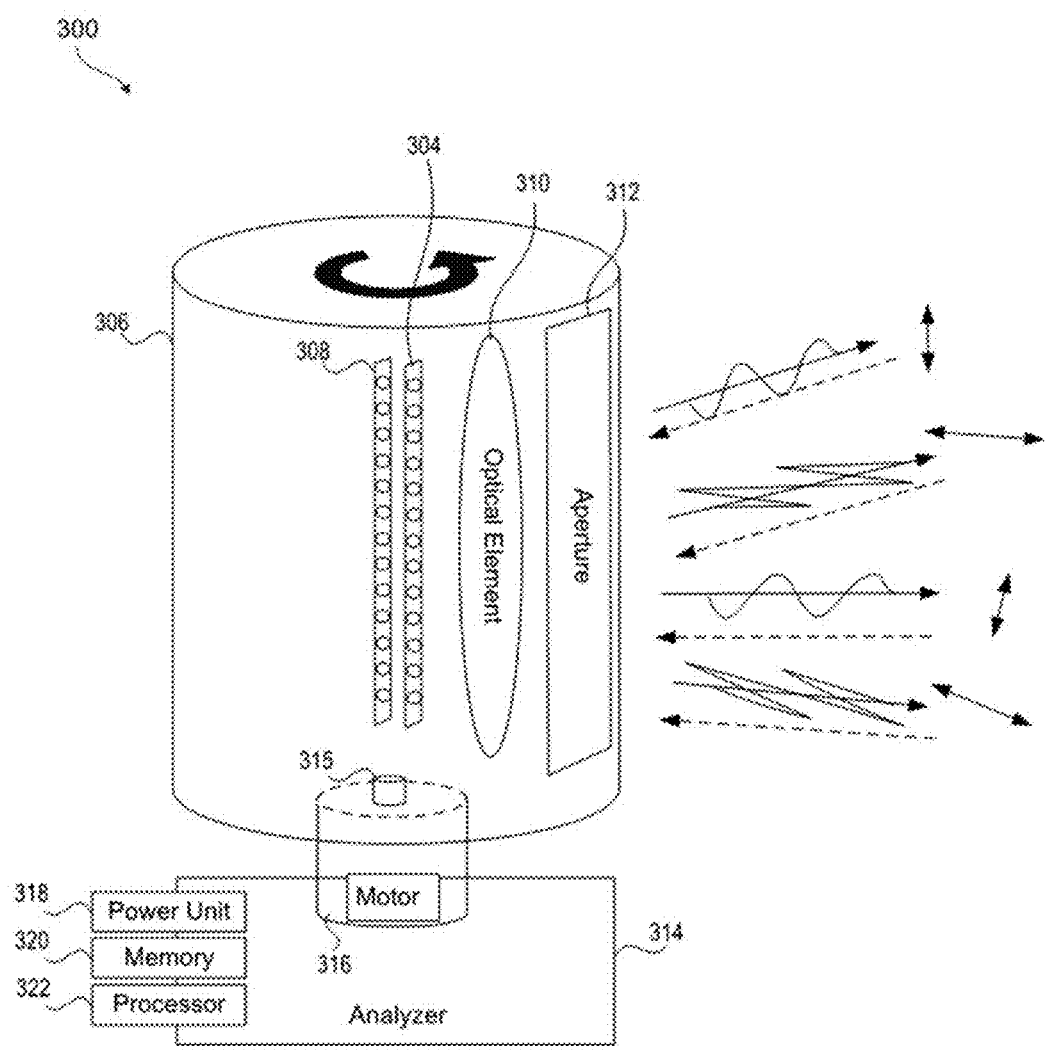
FIG. 3 illustrates an exemplary architecture for a Light Detection and Ranging ("LiDAR") system, in accordance with aspects of the disclosure.

FIG. 3 illustrates an exemplary architecture for a LiDAR system 300, in accordance with aspects of the disclosure. LiDAR system 264 of FIG. 2 may be the same as or substantially similar to the LiDAR system 300. As such, the discussion of LiDAR system 300 is sufficient for understanding LiDAR system 264 of FIG. 2. It should be noted that the LiDAR system 300 of FIG. 3 is merely an example LiDAR system and that other LiDAR systems are further completed in accordance with aspects of the present disclosure, as should be understood by those of ordinary skill in the art.

As shown in FIG. 3, the LiDAR system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The LiDAR system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

LiDAR system 300 includes a power unit 318 to power the light emitting unit 304, a motor 316, and electronic components. LiDAR system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
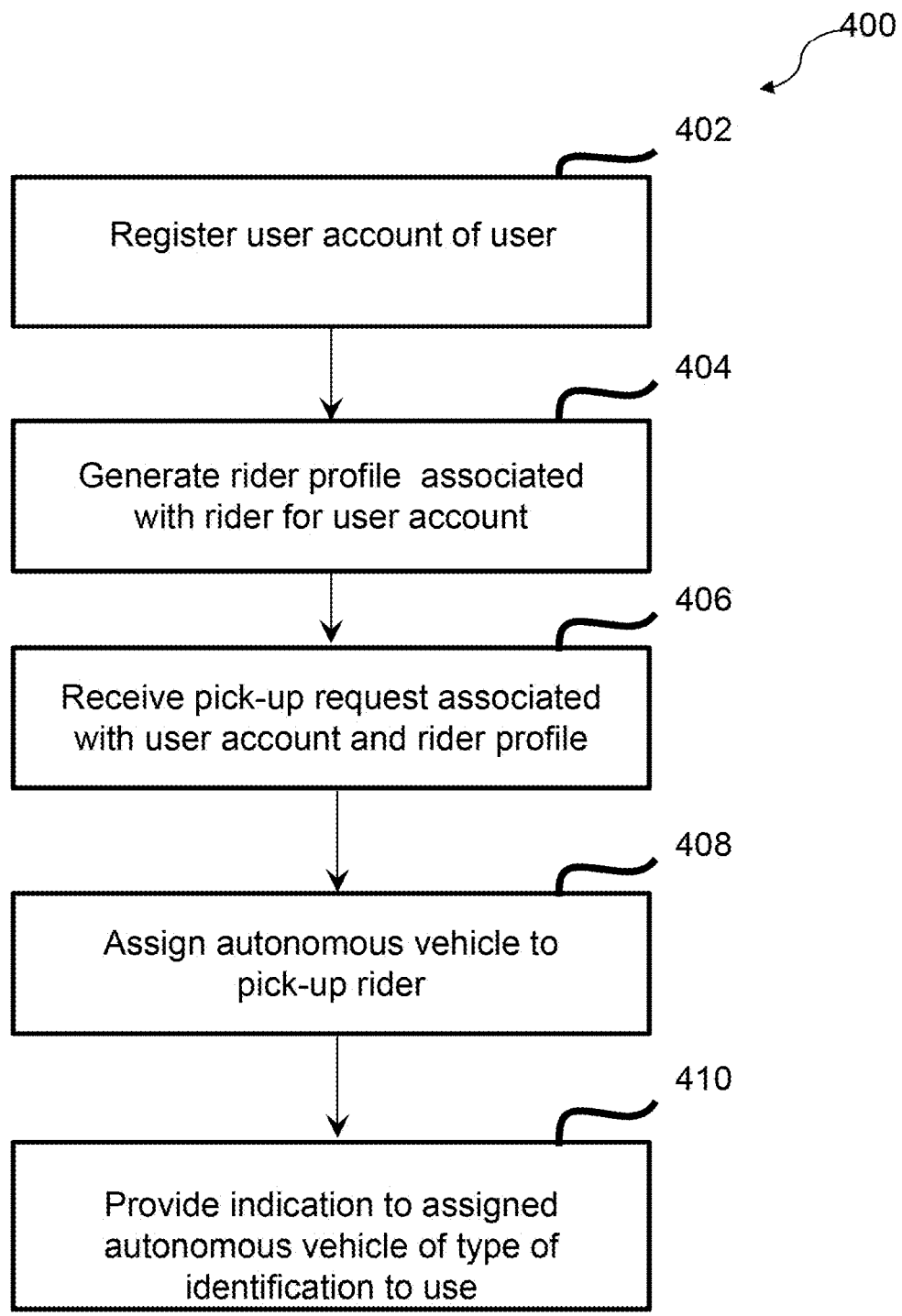
FIG. 4 illustrates an exemplary process, in accordance with aspects of the disclosure.

Referring now to FIG. 4, FIG. 4 illustrates an exemplary process 400, in accordance with aspects of the disclosure.

As shown in FIG. 4, at step 402, process 400 includes registering a user account of a user for an autonomous vehicle service. For example, remote computing device 110 may register a user account of a user for an autonomous vehicle service. As an example, a potential user or existing user of an autonomous vehicle service may download and install a software application on user device 150 that electronically links user device 150 to remote computing device 110. Once installed on user device 150, the software application may enable a prospective user to initiate a new account with remote computing device 110, and/or an existing user to connect to and use (e.g., request and pay for rideshares, etc.) the autonomous vehicle service. In some examples, access to a user account of a user on remote computing device 110 requires logging in with credentials to verify the user's identity and authorization to use the user account in question.

A user account may be associated with one or more rider profiles associated with one or more riders. For example, remote computing device 110 may store (e.g., in database 112, etc.) the one or more rider profiles in association with the user account. Each of the one or more rider profiles associated with the one or more riders may be associated with a rider level of a plurality of rider levels. For example, the plurality of rider levels may include a lowest rider level (e.g., a temporary rider level, etc.), a middle rider level (e.g., a friend rider level, a client rider level, etc.), and a highest rider level (e.g., a family rider level, etc.), and/or the like. The lowest rider level or the temporary rider level may be associated with "one-off" or single-use rider profiles that may be automatically deleted by remote computing device 110 and/or the software application after a ride service for the rider ends (or at a predetermined time thereafter). Higher rider levels, such as a friend rider level, a client rider level, a family rider level, and/or the like may be associated with permanent rider profiles that may be saved or stored indefinitely by remote computing device 110 (e.g., in database 112, etc.) and/or the software application (e.g., until deleted by the user, etc.). Permanent rider profiles associated with one or more higher rider levels (e.g., the highest rider level, etc.) may be associated with and/or enable setting of custom features, such as advanced pick-up scheduling (e.g., scheduling days and/or weeks ahead of a pick-up date, etc.), recurring pick-up scheduling (e.g., scheduling a pick-up on Tuesday of each week, etc.), custom ride experiences (e.g., use of biometric information to identify the rider and/or unlock autonomous vehicles assigned to pick-up the rider, etc.), and/or the like. A rider profile associated with the user associated with the user account may be automatically associated with the highest rider level of the plurality of rider levels (e.g., the family rider level, etc.), and/or the user associated with the user account may assign (e.g., via the software application, etc.) one or more additional rider profiles associated with one or more additional riders to a rider level of the plurality of rider levels.

As shown in FIG. 4, at step 404, process 400 includes generating a rider profile associated with a rider for a user account. For example, remote computing device 110 may generate a rider profile associated with a rider for the user account. As an example, remote computing device 110 may receive, from user device 150 associated with the user account of the user for the autonomous vehicle service (e.g., via the software application, etc.), a request to add a rider profile associated with a rider (e.g., a rider other than the user associated with the user account, etc.) to the user account and/or rider information associated with the rider. For example, remote computing device 110 may obtain the rider information associated with the rider from a device record (e.g., a contact entry in a contact list, etc.) stored on user device 150 in association with the rider and/or from user input to user device 150. As an example, the user device 150 may provide (e.g., via the software application, etc.), to remote computing device 110, the rider information associated with the rider from a device record stored on user device 150 in association with the rider (e.g., if authorized by the user on device 150 in response to a request from the application to access the user's device records, etc.) and/or from the user input to user device 150 (e.g., rider information entered manually by the user, etc.). In such an example, remote computing device 110 may generate, based on the rider information associated with the rider received from user device 150, the rider profile associated with the rider for the user account (e.g., a rider profile different than the rider profile associated with the user of the user account, etc.) and/or store (e.g., in database 112, etc.) the rider profile including the rider information associated with the rider in association with the user account of the user. For example, the rider profile may include the rider information associated with the rider including a rider level of the plurality of rider levels associated with the rider and/or a type of identification to use to identify the rider and/or unlock the autonomous vehicle when picking-up the rider.

Rider information associated with a rider (e.g., a rider profile, etc.) may include a name, a phone number, an email address, a mailing address, a rider level of the plurality of rider levels (e.g., the lowest rider level, the middle rider level, the highest rider level, etc.), an authorization or a denial for use of automatic entry (e.g., unlocking autonomous vehicles when picking up the user without remote user input from the user via the software application, etc.), a type of identification (e.g., a link or URL in an email sent to the rider, a passcode entered via an input device (e.g., a microphone using speech-to-text, a keypad, a touchscreen, etc.) on an autonomous vehicle, remote control by the user via the software application, biometric identification, etc.) to use to identify the rider and/or unlock the autonomous vehicle when picking-up the rider, custom features, and/or the like. Custom features associated with a rider (e.g., a rider profile, etc.), which may be enabled for permanent rider profiles associated with one or more higher rider levels, may include parameters for an advanced scheduled pick-up, a recurrent pick-up, a multipoint destination, rider preferences (e.g., music, driving style, etc.), any combination thereof, and/or the like. For example, parameters for an advanced scheduled pick-up associated with a rider profile may include parameters, such as a time, a day, a pick-up location, an indication of whether to use automatic entry, a type of identification to use to identify the rider and/or unlock the autonomous vehicle when picking up the user, a final drop-off location, a number of passengers or riders, and/or the like. For example, parameters for a recurrent pick-up associated with a rider profile may include parameters, such as a recurring time, day, week, month and/or year (e.g., daily at a same time, weekly at a same time on selected days of the week, each week, every other week, monthly, yearly, etc.). For example, parameters for a multi-point destination associated with a rider profile may include parameters, such as a plurality of stop or destination locations, an order of the plurality of stop or destination locations, an amount of time to wait at each stop or destination location, and/or the like.

For example, parameters for rider preferences associated with a rider profile may include parameters, such as a child/infant seat in autonomous vehicles assigned to pick-up the rider, a driving style preference, a music preference, a vehicle interior temperature preference, and/or the like.

A user associated with a user account associated with a rider profile of a rider may edit or update the rider profile associated with the rider in the software application with new or updated rider information including custom features during an initial generation of the rider profile and/or at any time thereafter. For example, remote computing device 110 may store (e.g., in database 112, etc.) parameters of custom features in a marked-up language format for a rider profile's customized ridership experience and/or display the parameters in a calendar format for the user to view on user device 150 (e.g., via the software application, etc.), which can be automatically added into personal calendars of the user and/or the rider.

Further details regarding non-limiting embodiments or aspects of step 404 of process 400 are provided below with regard to FIGS. 5A and 5B.

As shown in FIG. 4, at step 406, process 400 includes receiving a pick-up request associated with a user account and a rider profile. For example, remote computing device 110 may receive, from user device 150 associated with the user account (e.g., via the software application, etc.), a pick-up request associated with the user account of the user and the rider profile associated with the rider. As an example, a pick-up request may include at least one of the following parameters: a pick-up location (e.g., a location of the rider, a location of user device 150, a requested location, etc.), a destination location, a time at which the pick-up request is received, a time at which the rider is to be picked-up, a rider profile, and/or the like.

As shown in FIG. 4, at step 408, process 400 includes assigning an autonomous vehicle to pick-up a rider. For example, remote computing device 110 may assign, based on the pick-up request, an autonomous vehicle 102a (e.g., an autonomous vehicle of a fleet or plurality of autonomous vehicles, etc.) to pick-up the rider. As an example, remote computing device 110 may select autonomous vehicle 102a to assign to pick-up the rider based on one or more parameters of the pick-up request, one or more preferences of the rider received from the user and/or stored in association with the rider profile of the rider, and/or one or more identification capabilities of the autonomous vehicle 102a (e.g., fingerprint identification capability, facial recognition capability, etc.). For example, if the rider profile of the rider includes an indication of a particular type of identification to use to unlock the autonomous vehicle when picking-up the rider (e.g., automatic identification, remote identification, fingerprint identification, facial recognition, etc.) remote computing device 110 may give preference to selecting (e.g., weight more heavily in a selection algorithm, etc.) an autonomous vehicle from a plurality of available autonomous vehicles that has that particular identification capability.

As shown in FIG. 4, at step 410, process 400 includes providing, to an autonomous vehicle assigned to pick-up a rider, an indication of a type of identification to use to identify the rider and/or unlock the autonomous vehicle when picking-up the rider. For example, remote computing device 110 may provide, to autonomous vehicle 102a assigned to pick-up the rider, based on the rider profile associated with the rider, an indication of a type of identification to use to identify the rider and/or unlock autonomous vehicle 102a when picking-up the rider. As an example, an indication of a type of identification to use to identify the rider and/or unlock autonomous vehicle 102a when picking-up the rider may include a flag set in a message indicating the approval to use biometric identification and/or the preference to use the specific type of biometric identification, encrypted biometric information associated with the user, a biometric encryption key, and/or the like. As an example, an absence or opposite value of a flag in a message indicating the a type of identification to use to identify the rider and/or unlock autonomous vehicle 102a when picking-up the rider may be provided as an indication to forgo attempting to use biometric identification. In some embodiments, remote computing device 110 may provide, to autonomous vehicle 102a assigned to pick-up the rider, the rider profile itself.

In some embodiments, remote computing device 110 may provide, to user device 150 (e.g., via the software application, etc.) a confirmation of the autonomous vehicle 102a being assigned to pick-up the rider and/or receiving the indication of the type of identification to use to identify the rider and/or unlock autonomous vehicle 102a when picking-up the rider. For example, such a confirmation may include a unique identifier of autonomous vehicle 102a, a license plate number, a description of autonomous vehicle 102a (e.g., color, vehicle make and/or model, etc.), an estimated pick-up time, an estimated ride time, an indication of vehicle capabilities (e.g., biometric identification, passcode ability, etc.), any combination thereof, and/or the like.

Figure 5A:
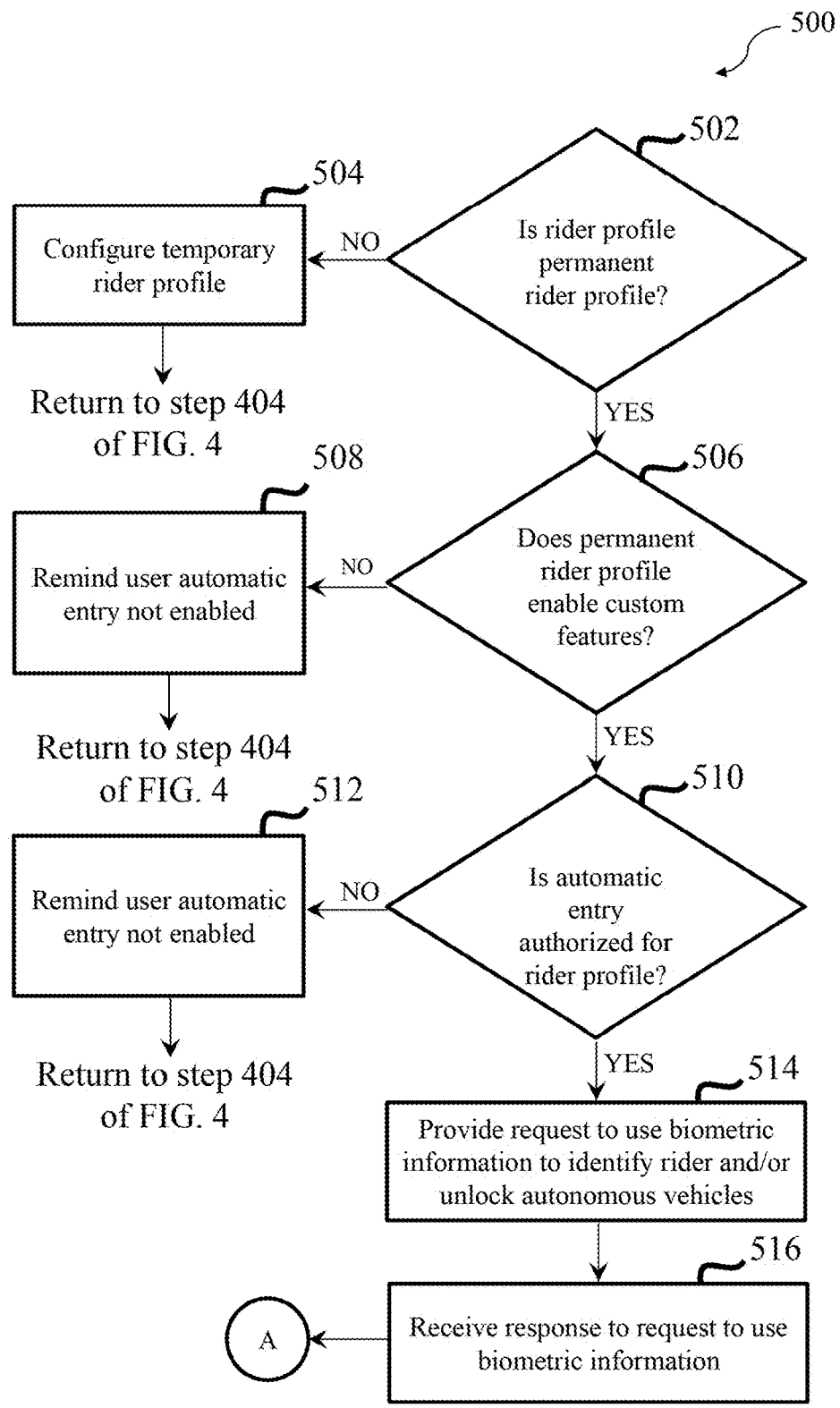
FIGS. 5A and 5B illustrate an exemplary process, in accordance with aspects of the disclosure.
Figure 5B:
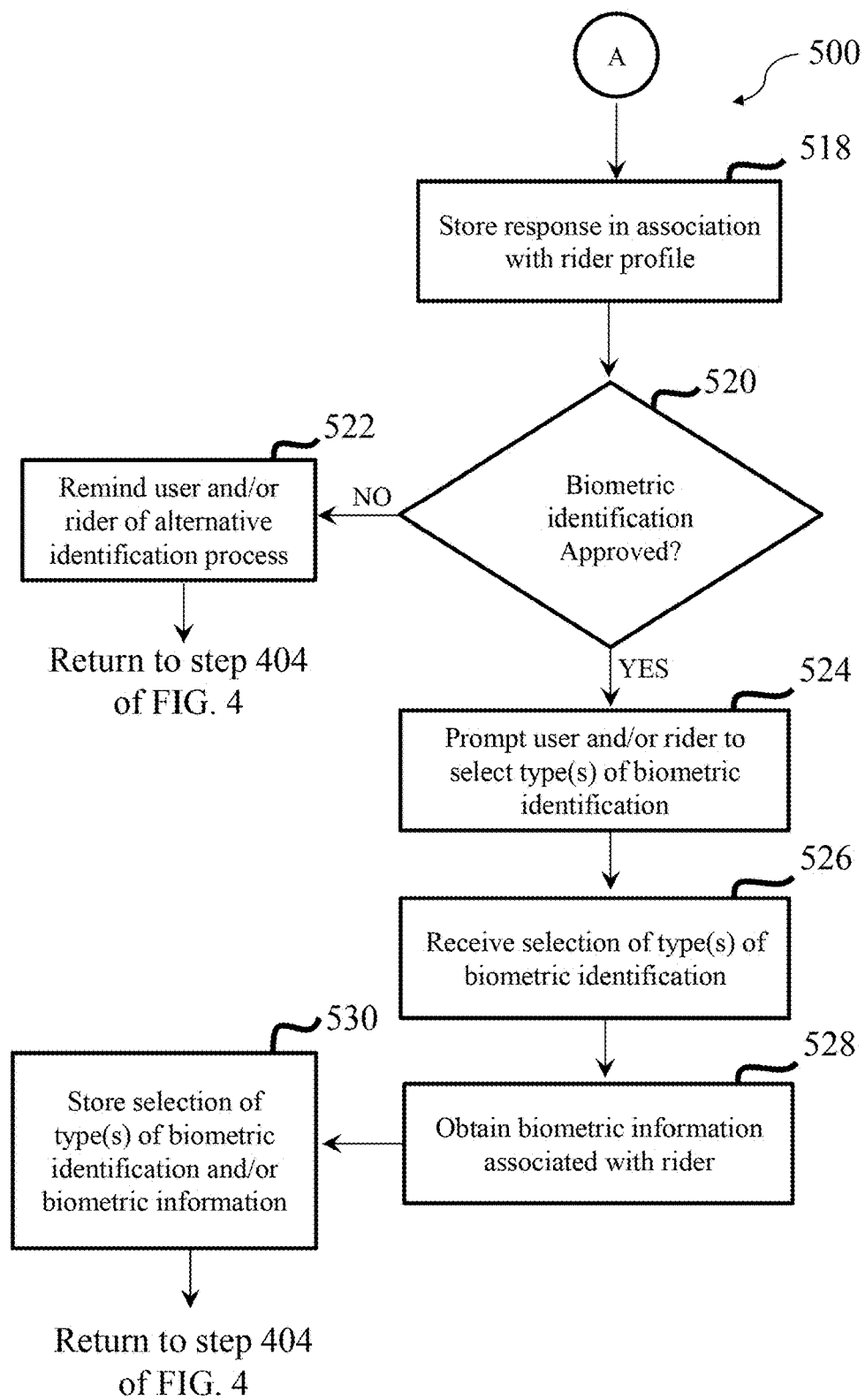

Referring now to FIGS. 5A and 5B, FIGS. 5A and 5B illustrate an exemplary process 500, in accordance with aspects of the disclosure.

As shown in FIG. 5A, at step 502, process 500 includes determining whether a rider profile is a permanent rider profile. For example, remote computing device 110 and/or user device 150 (e.g., using the software application, etc.) may determine whether the rider level associated with the rider profile includes a rider level associated with a permanent rider profile. As an example, remote computing device 110 and/or user device 150 (e.g., using the software application, etc.) may, in response to generating the rider profile, determine whether the rider level associated with the rider profile includes a rider level associated with a permanent rider profile.

As shown in FIG. 5A, at step 504, process 500 includes, in response to determining that a rider profile is not a permanent rider profile, configuring the rider profile as a temporary rider profile. For example, remote computing device 110 and/or user device 150 (e.g., using the software application, etc.) may, in response to determining that the rider profile is not a permanent rider profile, configure the rider profile as a temporary rider profile. As an example, remote computing device 110 and/or user device 150 (e.g., using the software application, etc.) may determine, based on whether contact information (e.g., a phone number, an email address, etc.) of the rider is included in the rider profile, options for one or more types of identification to use to identify the rider and/or unlock the autonomous vehicle when picking-up the rider, and provide the options to the user via the software application for selection by the user. As an example, if a phone number and/or email address of the rider is included in the rider profile, options for identification may include (i) using only remote control by the user via the software application, (ii) using only automatic entry via a passcode and/or link or URL provided to the rider via the contact information, and/or (iii) using each of remote control by the user via the software application and a passcode and/or link or URL provided to the rider via the contact information. As an example, if a phone number and/or email address is not included in the rider profile, options for identification may include (i) using only remote control by the user via the software application, (ii) using only automatic entry via a passcode provided to the rider by the user, and/or (iii) using each of remote control by the user via the software application and the passcode. In such an example, remote computing device 110 may receive a selected option for identification of the rider via user device 150 (e.g., using the software application, etc.) and store the selected option in the temporary rider profile associated with the rider.

After receiving the selected type of identification in step 504 of process 500, processing may return to step 404 of FIG. 4 in which the selected type of identification may be stored (e.g., temporarily stored, etc.) in association with the temporary rider profile of the rider.

As shown in FIG. 5A, at step 506, process 500 includes, in response to determining that a rider profile is a permanent rider profile, determining whether the rider profile is a permanent rider profile associated with custom features. For example, remote computing device 110 and/or user device 150 (e.g., using the software application, etc.) may determine whether the rider level associated with the rider profile includes a rider level associated with a permanent rider profile that enables custom features. As an example, remote computing device 110 and/or user device 150 (e.g., using the software application, etc.) may, in response to determining that the rider profile is a permanent rider profile, determine whether the rider level associated with the rider profile includes a rider level associated with a permanent rider profile that enables custom features.

As shown in FIG. 5A, at step 508, process 500 includes, in response to determining that a rider profile is not a permanent rider profile associated with custom features, reminding a user and/or a rider that automatic entry is not enabled (e.g., that user input is used to identify the rider and/or unlock an autonomous vehicle when picking-up the rider, etc.). For example, remote computing device 110 and/or user device 150 (e.g., using the software application, etc.) may, in response to determining that the rider profile is not a permanent rider profile associated with custom features, provide, to user device 150 associated with the user account of the user for the autonomous vehicle service (e.g., via the software application, etc.) and/or to another user device associated with the rider (e.g., via a text message, via an email, etc.), a message including a reminder that user input is used to identify the rider and/or unlock an autonomous vehicle when picking-up the rider. As an example, the message may include a reminder that an autonomous vehicle assigned to pick-up the rider may be unlocked when picking-up the rider only after the user accepts an entry request presented to the user via the software application on user device 150 when the rider is identified in a vicinity of the autonomous vehicle (e.g., a reminder that automatic entry is not enabled, etc.). In such an example, the message may include a further reminder that data used to identify the rider in the entry request presented to the user is permanently deleted after the entry request is accepted or denied by the user. For example, when picking-up a rider, autonomous vehicle 102a may provide the user (e.g., via the software application, etc.) an image of a rider attempting to enter autonomous vehicle 102a (e.g., in response to actuation of a door handle, in response to receipt of a passcode, in response to identification of the rider via one or more other identification techniques, such as a biometric identification technique, and/or the like, etc.) and a prompt for the user to confirm that autonomous vehicle 102a is to be unlocked for the rider in the image.

As shown in FIG. 5A, at step 510, process 500 includes, in response to determining that a rider profile is a permanent rider profile associated with custom features, determining whether automatic entry is authorized for the rider profile. For example, remote computing device 110 and/or user device 150 (e.g., using the software application, etc.) may, in response to determining that the rider profile is a permanent rider profile associated with custom features, determine whether automatic entry is authorized for the rider profile. As an example, remote computing device 110 and/or user device 150 (e.g., using the software application, etc.) may determine whether the rider information included in the rider profile associated with the rider includes an authorization from the user and/or the rider for automatic entry. As an example, remote computing device 110 and/or user device 150 (e.g., using the software application, etc.) may receive, from user device 150 associated with the user account of the user for the autonomous vehicle service (e.g., via the software application, in response to a prompt therefor, etc.), an authorization or a denial from the user and/or the rider for automatic entry.

As shown in FIG. 5A, at step 512, process 500 includes, in response to determining that automatic entry is not authorized, reminding a user and/or a rider that automatic entry is not enabled (e.g., that user input is used to identify the rider and/or unlock an autonomous vehicle when picking-up the rider, etc.). For example, remote computing device 110 and/or user device 150 (e.g., using the software application, etc.) may, in response to determining that the rider profile is not a permanent rider profile associated with custom features, provide, to user device 150 associated with the user account of the user for the autonomous vehicle service (e.g., via the software application, etc.) and/or to another user device associated with the rider (e.g., via a text message, via an email, etc.), a message including a reminder that user input is used to identify the rider and/or unlock an autonomous vehicle when picking-up the rider. As an example, the message may include a reminder that an autonomous vehicle assigned to pick-up the rider may be unlocked when picking-up the rider only after the user accepts an entry request presented to the user via the software application on user device 150 when the rider is identified in a vicinity of the autonomous vehicle (e.g., a reminder that automatic entry is not enabled, etc.). In such an example, the message may include a further reminder that data used to identify the rider in the entry request presented to the user is permanently deleted after the entry request is accepted or denied by the user. For example, when picking-up a rider, autonomous vehicle 102a may provide the user (e.g., via the software application, etc.) an image of a rider attempting to enter autonomous vehicle 102a (e.g., in response to actuation of a door handle, in response to receipt of a passcode, etc.) and a prompt for the user to confirm that autonomous vehicle 102a is to be unlocked for the rider in the image.

After providing the message to the user at step 512 of process 500, processing may return to step 404 of FIG. 4 in which a disablement of custom features may be stored in association with the rider profile of the rider.

As shown in FIG. 5A, at step 514, process 500 includes, in response to determining that automatic entry is authorized, providing a request to use biometric information/identification to unlock autonomous vehicles assigned to pick-up a rider. For example, remote computing device 110 and/or user device 150 (e.g., using the software application, etc.) may provide, to user device 150 associated with the user account of the user for the autonomous vehicle service (e.g., via the software application, etc.) and/or to another user device associated with the rider (e.g., via a text message, via an email, etc.), a request to use biometric identification (e.g., fingerprint identification, facial recognition, etc.) to unlock autonomous vehicles assigned to pick-up the rider.

As shown in FIG. 5A, at step 516, process 500 includes receiving a response to a request to use biometric identification. For example, remote computing device 110 may receive, from user device 150 associated with the user account (e.g., via the software application, etc.) and/or from another user device associated with the rider (e.g., via a text message, via an email, etc.), a response to the request to use biometric identification to unlock autonomous vehicles assigned to pick-up the rider. As an example, the response may include one of an approval and a denial of the request.

As shown in FIG. 5B, at step 518, process 500 includes storing a response to a request to use biometric identification in association with a rider profile of a rider. For example, remote computing device 110 may store (e.g., in database 112, etc.) the response to the request to use biometric identification to unlock autonomous vehicles assigned to pick-up the rider in association with the rider profile of the rider. As an example, remote computing device 110 may store the one of the approval and the denial of the request (e.g., as a flag, etc.) in association with the user account of the user.

As shown in FIG. 5B, at step 520, process 500 includes, in response to receiving a response to a request to use biometric identification, determining whether the response includes an approval and a denial of the request to use biometric identification. For example, remote computing device 110 and/or user device 150 (e.g., using the software application, etc.) may determine, based on the response, whether the response includes an approval or a denial of the request to use biometric identification to identify the rider and/or unlock autonomous vehicles assigned to pick-up the rider.

As shown in FIG. 5B, at step 522, process 500 includes, in response to determining that the response includes a denial of the request to use biometric identification to identify the rider and/or unlock autonomous vehicles assigned to pick-up the rider, reminding the user and/or the rider of an alternative identification process to be used to identify the rider and/or unlock autonomous vehicles assigned to pick-up the rider. For example, remote computing device 110 and/or user device 150 (e.g., using the software application, etc.) may provide, to user device 150 associated with the user account of the user for the autonomous vehicle service (e.g., via the software application, etc.) and/or to another user device associated with the rider (e.g., via a text message, via an email, etc.), a message including a reminder of an alternative identification process to be used to unlock autonomous vehicles assigned to pick-up the rider (e.g., unlock via a link or URL in an email and/or SMS message sent to the rider, unlock via a passcode entered via an input device on the autonomous vehicles, a "swipe to unlock" action in the software application on user device 150, etc.). In such an example, the message may include a further reminder that the user may enroll the rider at a later time via the software application to use biometric identification (e.g., by updating the rider profile associated with the rider in the software application, etc.).

After providing the message to the user at step 522 of process 500, processing may return to step 404 of FIG. 4 in which the preference of the user and/or rider to not use biometric identification may be stored in association with the rider profile of the rider.

As shown in FIG. 5B, at step 524, process 500 includes, in response to determining that the response includes an acceptance of the request to use biometric identification to identify the rider and/or unlock autonomous vehicles assigned to pick-up the rider, prompting the user and/or the rider to select a type of biometric identification to be used to identify the rider and/or unlock autonomous vehicles assigned to pick-up the rider. For example, remote computing device 110 and/or user device 150 (e.g., using the software application, etc.) may provide, to user device 150 associated with the user account of the user for the autonomous vehicle service (e.g., via the software application, etc.) and/or to another user device associated with the rider (e.g., via a text message, via an email, etc.), a prompt requesting that the user and/or the rider select from and/or rank a plurality of types of biometric identification (e.g., fingerprint identification, facial recognition, voice recognition, etc.) to be made available for use in identifying the rider and/or unlocking autonomous vehicles assigned to pick-up the rider.

As shown in FIG. 5B, at step 526, process 500 includes receiving a selection of one or more types of biometric identification to be used to identify the rider and/or unlock autonomous vehicles assigned to pick-up the rider. For example, remote computing device 110 may receive, from user device 150 associated with the user account of the user for the autonomous vehicle service (e.g., via the software application, etc.) and/or from another user device associated with the rider (e.g., via a text message, via an email, etc.), a selection and/or a ranking of one or more types of biometric identification to be used to identify the rider and/or unlock autonomous vehicles assigned to pick-up the rider. In such an example, if the user and/or the rider selects multiple types of biometric identification, the user and/or the rider may rank the selected types of biometric identification in an order in which the user and/or the rider prefers that autonomous vehicles use the selected types of biometric identification to attempt to identify the rider and/or unlock autonomous vehicles assigned to pick-up the rider. For example, the user and/or the rider may prefer that autonomous vehicles first attempt to identify the rider using facial recognition and, if the facial recognition is unsuccessful or unavailable, to attempt to identify the rider using fingerprint recognition.

As shown in FIG. 5B, at step 528, process 500 includes obtaining biometric information associated with the rider. For example, remote computing device 110 may obtain biometric information associated with the rider (e.g., fingerprint information, facial information, voice information, etc.). As an example, remote computing device 110 may receive, from user device 150 associated with the user account of the user for the autonomous vehicle service (e.g., via the software application, in response to a prompt therefor, etc.) and/or from another user device associated with the rider (e.g., via a text message, via an email, etc.), the biometric information associated with the rider. In such an example, the biometric information may include existing biometric information previously stored in user device 150 of the user and/or the another user device of the rider (e.g., a fingerprint scan, one or more images of the user's face, one or more audio files, etc.) and/or biometric information captured by user device 150 (e.g., via a camera, via a thumb pad, via a microphone, etc.) using the software application and/or biometric information captured by the another user device associated with the rider and provided to the software application and/or remote computing device 110.

In some non-limiting embodiments or aspects, remote computing device 110 may verify the biometric information received from user device 150 by asking the rider to authenticate themselves by capturing real-time or current biometric information with user device 150 and comparing the real-time or current biometric information to the previously received biometric information. For example, remote computing device 110 may verify that fingerprint and/or facial information received through the software application on user device 150 can be used to accurately identify the rider. In such an example, remote computing device 110 may remind the user and/or the rider that an alternative identification process may be used to identify the rider and/or unlock autonomous vehicles assigned to pick-up the rider if the biometric identification is unsuccessful in identifying the rider. If the verification is unsuccessful, remote computing device 110 may request that the user and/or the rider provide updated and/or different biometric information associated with the rider and attempt the verification process again.

As shown in FIG. 5B, at step 530, process 500 includes storing a selection of the user and/or the rider to use biometric identification, selected and/or ranked types of biometric identification, and/or biometric information associated with the rider in association with the rider profile of the rider. For example, remote computing device 110 may store (e.g., in database 112, etc.), the selection (e.g., the approval, the denial, etc.) of the user and/or the rider to use biometric identification, the selected and/or ranked types of biometric identification, and/or the biometric information associated with the rider in association with the rider profile of the rider. As an example, in response to obtaining the biometric information associated with the rider and/or verifying the obtained biometric information, processing may proceed to step 530 of FIG. 5 and/or return to step 404 of FIG. 4 in which the approval of the user and/or the rider to use biometric identification, the selected and/or ranked types of biometric identification, and the biometric information associated with the rider are stored in association with the rider profile of the rider. In such an example, remote computing device 110 and/or user device 150 (e.g., using the software application, etc.) may provide, to user device 150 associated with the user account of the user for the autonomous vehicle service (e.g., via the software application, etc.) and/or to another user device associated with the rider (e.g., via a text message, via an email, etc.), a message including a reminder that the user may receive (e.g., via the software application, etc.) a confirmation in response to the rider being identified by an autonomous vehicle assigned to pick-up the rider and/or in response to the autonomous vehicle being unlocked when picking-up the rider and/or a further reminder that data used to identify the rider in the confirmation presented to the user is permanently deleted after review by the user.

In some non-limiting embodiments or aspects, before storing the approval of the rider to use biometric identification, the selected and/or ranked types of biometric identification, and/or the biometric information associated with the rider in association with the rider profile of the rider, remote computing device 110 may verify that the biometric information is usable to identify the user. Remote computing device 110 may provide, to user device 150 and/or another user device associated with the rider, a request to verify the biometric information, and/or receive, from user device 150 and/or the another user device, sensor data captured by one or more sensors of user device 150 and/or the another user device after user device 150 and/or the another user device receives the request to verify the biometric information. For example, the sensor data may include a same type of data as the biometric information, such as an image of the user, a fingerprint scan of the user, a voice recording of the user, any combination thereof, and/or the like. Remote computing device 110 may process, using a biometric identification technique, the sensor data and the biometric information associated with the rider in a biometric identification attempt to identify the rider. Remote computing device 110 may verify, based on the biometric identification technique identifying the rider, that the biometric information is usable to identify the rider. Remote computing device 110 may provide, to user device 150 and/or the another user device, a request to provide alternate biometric information (e.g., repeat step 510, etc.) based on the biometric identification technique failing to identify the user.

Figure 6:
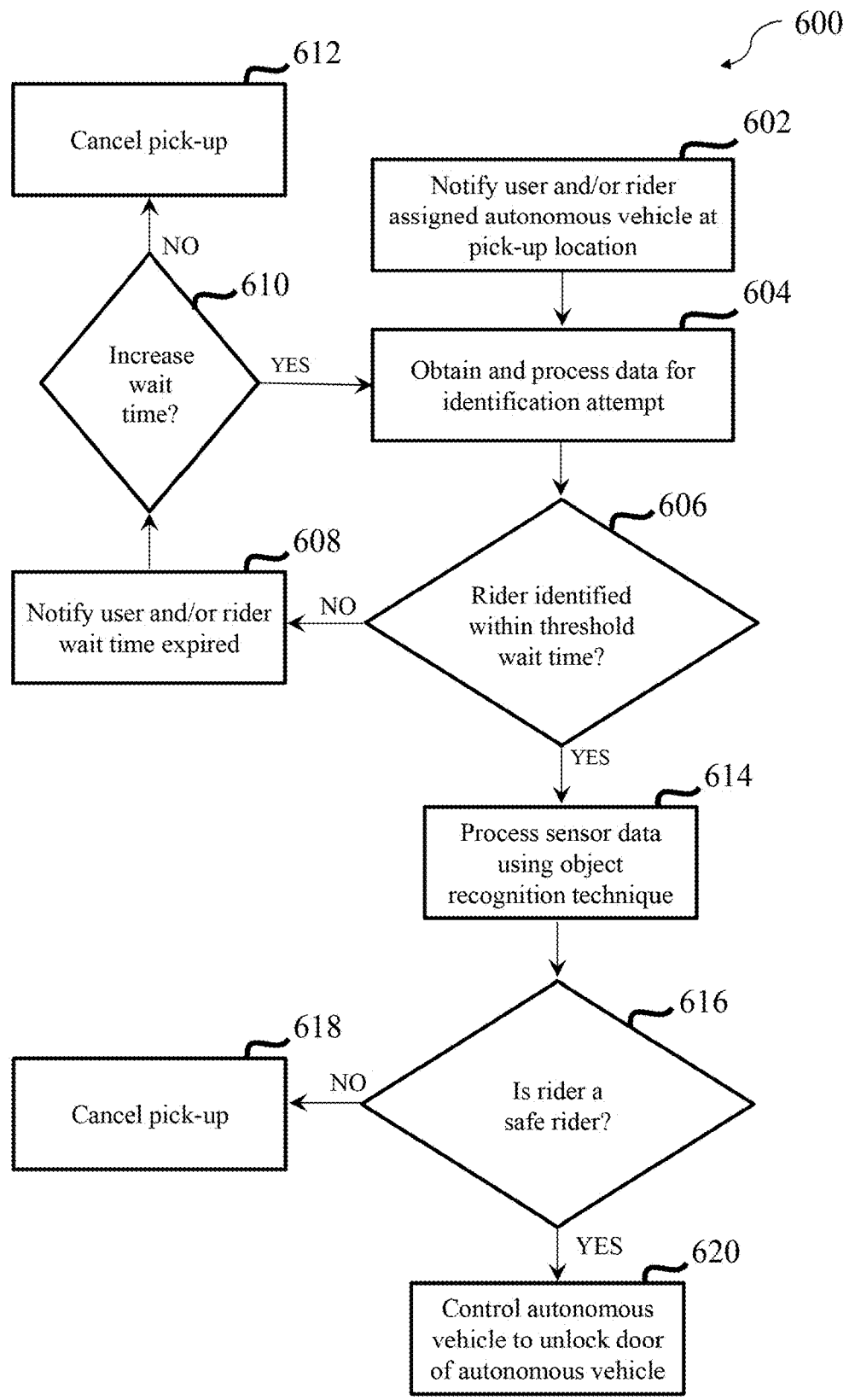
FIG. 6 illustrates an exemplary process, in accordance with aspects of the disclosure.

Referring now to FIG. 6, FIG. 6 illustrates an exemplary process 600, in accordance with aspects of the disclosure.

As shown in FIG. 6, at step 602, process 600 includes notifying a user and/or a rider that an autonomous vehicle assigned to pick-up a rider is at a pick-up location. For example, remote computing device 110 and/or on-board computing device 113 may obtain vehicle location information associated with a location of autonomous vehicle 102a assigned to pick-up the rider. As an example, location sensor 260 (e.g., a GPS device, etc.) of autonomous vehicle 102a may determine the location of autonomous vehicle 102a (e.g., GPS coordinates, etc.), and on-board computing device 113 may receive the location (e.g., continuously receive, periodically receive, etc.) from location sensor 260 and/or transmit the location to remote computing device 110 (e.g., continuously transmit, periodically transmit, etc.). As an example, remote computing device 110 and/or on-board computing device 113 may determine whether autonomous vehicle 102a assigned to pick-up the rider is within a threshold distance of a pick-up location associated with the pick-up request based on the vehicle location information and the pick-up location associated with the pick-up request. For example, remote computing device 110 and/or on-board computing device 113 may determine a distance between GPS coordinates associated with the vehicle information and GPS coordinates associated with the pick-up location. In such an example, in response to determining that autonomous vehicle 102a assigned to pick-up the rider is within the threshold distance of the pick-up location associated with the pick-up request, remote computing device 110 and/or on-board computing device 113 may notify the user (e.g., via the software application, etc.) and/or the rider (e.g., via a text message or email to another user device associated with the rider if contact information of the rider is included in the rider profile of the rider, etc.) that autonomous vehicle 102a is at and/or in the vicinity of the pick-up location.

As shown in FIG. 6, at step 604, process 600 includes obtaining and processing data for an identification attempt. For example, remote computing device 110 and/or on-board computing device 113 may, based on determining that autonomous vehicle 102a is within the threshold distance of the pick-up location, obtain and process data in an identification attempt (e.g., using a passcode-based technique, using a user input-based technique, using a biometric identification technique, using a rider input-based technique, etc.) to identify the rider in the environment surrounding autonomous vehicle 102a assigned to pick-up the rider and/or to unlock autonomous vehicle 102a to allow entry of the rider. As an example, the data obtained and processed for the identification attempt may include data, such as rider input to the another user device of the rider (if available), sensor data associated with an environment surrounding autonomous vehicle 102a, user input to user device 150, rider input to autonomous vehicle 102a (e.g., a passcode input to an input device of autonomous vehicle 102a, etc.), any combination thereof, and/or the like. In such an example, remote computing device 110 and/or on-board computing device 113 may process the data in an identification attempt to identify the rider in the environment surrounding autonomous vehicle 102a assigned to pick-up the rider and/or to unlock autonomous vehicle 102a to allow entry of the rider.

In some non-limiting embodiments or aspects, if automatic entry is enabled for a rider profile associated with a rider (e.g., user input is not used to identify or confirm the rider and/or unlock an autonomous vehicle when picking-up the rider, etc.), remote computing device 110 and/or on-board computing device 113 may obtain and process data in an identification attempt to identify the rider in the environment surrounding autonomous vehicle 102a assigned to pick-up the rider and/or to unlock autonomous vehicle 102a to allow entry of the rider without receiving user input entered into user device 150 by the user (e.g., via the software application, etc.). In such an example, remote computing device 110 and/or on-board computing device 113 may notify the user (e.g., via the software application, etc.) when the rider has been identified and/or autonomous vehicle 102a has been unlocked to allow entry of the rider, such as by sending an image including the rider and/or an audio recording of the user's voice to confirm to the user that the rider has been picked-up by autonomous vehicle 102a. In such an example, after notifying the user that the rider has been picked-up, if the rider is associated with a temporary rider profile, remote computing device 110 and/or on-board computing device 113 may automatically delete the temporary rider profile associated with the rider and/or, image and/or voice data used to confirm to the user that the rider has been picked-up by autonomous vehicle 102a, and/or any other data associated with the temporary rider that has been stored by the ride-sharing service.

In some non-limiting embodiments or aspects, if automatic entry is not enabled for a rider profile associated with a rider (e.g., user input is used to identify the rider and/or unlock an autonomous vehicle when picking-up the rider, etc.), remote computing device 110 and/or on-board computing device 113 may additionally, or alternatively, obtain and process data that includes user input entered into user device 150 by the user (e.g., via the software application, etc.) in an identification attempt to identify the rider in the environment surrounding autonomous vehicle 102a assigned to pick-up the rider and/or to unlock autonomous vehicle 102a to allow entry of the rider. In such an example, remote computing device 110 and/or on-board computing device 113 may provide a prompt for the user to confirm the identity of the potential rider (e.g., via the software application, etc.), which when confirmed by the user (e.g., via the software application, etc.) transmits a request to remote computing device 110 and/or on-board computing device 113 to control autonomous vehicle 102a to unlock a door of autonomous vehicle 102a.

Data for an identification attempt that includes rider input to another user device of a rider may include rider input associated with an identification process on the another user device associated with the rider. For example, if a rider profile of a rider includes contact information of the rider (e.g., an email address, a telephone number, etc.), remote computing device 110 may send, based on assigning autonomous vehicle 102a to pick-up the rider, to the another user device associated with the rider an email and/or a text message including a link or URL, which when actuated or clicked on by the rider, transmits a request to remote computing device 110 and/or on-board computing device 113 to control autonomous vehicle 102a to unlock a door of autonomous vehicle 102a.

Data for an identification attempt that includes sensor data associated with an environment surrounding autonomous vehicle 102a for an identification attempt may include one or more images, one or more contact measurements (e.g., of a potential rider with a door handle, etc.), one or more fingerprint scans, one or more audio recordings, rider input to an input device (e.g., a keypad, etc.) of autonomous vehicle 102a, and/or the like. For example, the one or more cameras 262 of autonomous vehicle 102a may capture one or more images of the environment surrounding autonomous vehicle 102a, such as when a potential rider approaches autonomous vehicle 102a. As an example, autonomous vehicle 102a may include a contact sensor (e.g., on a door handle of a door of autonomous vehicle 102a, etc.), which may detect when a potential rider attempts to open a door of autonomous vehicle 102a. For example, autonomous vehicle 102a may include a fingerprint scanner (e.g., on a door handle of a door of autonomous vehicle 102a, etc.) configured to scan one or more fingerprints of a potential rider when the potential rider places their fingers on the scanner. As an example, autonomous vehicle 102a may include a microphone configured to capture one or more audio recordings of a voice of a potential rider.

Data for an identification attempt that includes user input to user device 150 may include user input associated with an identification process on user device 150. For example, remote computing device 110 and/or on-board computing device 113 may send sensor data associated with a potential rider to user device 150 with a prompt for the user to confirm the identity of the potential rider, which when confirmed by the user (e.g., via the software application, etc.) transmits a request to remote computing device 110 and/or on-board computing device 113 to control autonomous vehicle 102a to unlock a door of autonomous vehicle 102a. As an example, remote computing device 110 and/or on-board computing device 113 may send an image of the potential rider, an audio recording of the voice of the potential rider, and/or the like. The user may confirm or deny the potential rider, which when denied by the user, remote computing device 110 and/or on-board computing device 113 may continue to attempt to detect another potential rider until a waiting time lapses, and which when confirmed by the user, sends a command to autonomous vehicle 102a to unlock a door.

Sensor data for a biometric identification attempt may include one or more images for a facial recognition biometric identification attempt, one or more fingerprint scans for a fingerprint-based biometric identification attempt, one or more audio recordings for a voice recognition attempt, any combination thereof, and/or the like. For example, the one or more cameras 262 of autonomous vehicle 102a may capture one or more images of the environment surrounding autonomous vehicle 102a, which may include the face of the rider when the rider is nearby autonomous vehicle 102a. In such an example, remote computing device 110 and/or on-board computing device 113 may process, using a facial recognition technique, the one or more images with respect to the biometric information stored in association with the rider profile of the rider in an attempt to identify the rider's face in the one or more images. As an example, autonomous vehicle 102a may include a fingerprint scanner (e.g., on a door handle of a door of autonomous vehicle 102a, etc.) configured to scan one or more fingerprints of the rider when the rider places their fingers on the scanner. In such an example, remote computing device 110 and/or on-board computing device 113 may process, using a fingerprint recognition technique, the one or more fingerprint scans with respect to the biometric information stored in association with the rider profile of the rider in an attempt to identify the rider's fingerprint(s) in the one or more scans.

In some non-limiting embodiments or aspects, on-board computing device 113 may locally process, using the biometric identification technique, the sensor data and the biometric information associated with the rider in the biometric identification attempt to identify the rider in the environment surrounding autonomous vehicle 102a assigned to pick-up the rider. For example, remote computing device 110 and/or user device 150 (e.g., via the software application, etc.) may encrypt the biometric information associated with the rider and/or transmit, to autonomous vehicle 102a including on-board computing device 113 assigned to pick-up the rider, the encrypted biometric information. As an example, on-board computing device 113 may receive, from remote computing device 110 and/or user device 150, the encrypted biometric information in a message assigning autonomous vehicle 102a including on-board computing device 113 to pick-up the rider, in response to a request for the encrypted biometric information sent to remote computing device 110 and/or user device 150 by on-board computing device 113, and/or as part of another communication between autonomous vehicle 102a and remote computing device 110 and/or user device 150. In such an example, on-board computing device 113 may receive (e.g., separately receive, receive in a communication different than a communication in which the encrypted biometric information is received, etc.) and/or store an encryption key and use the encryption key for decrypting the encrypted biometric information. For example, on-board computing device 113 may receive, from remote computing device 110 and/or user device 150, the encryption key in a message assigning autonomous vehicle 102a including on-board computing device 113 to pick-up the rider, in response to a request for the encryption key sent to remote computing device 110 and/or user device 150 by on-board computing device 113, and/or as part of another communication between autonomous vehicle 102a and remote computing device 110 and/or user device 150. In this way, on-board computing device 113 may locally process, using the biometric identification technique, the sensor data and the biometric information associated with the rider in the biometric identification attempt to identify the rider in the environment surrounding autonomous vehicle 102a assigned to pick-up the rider. In such an example, on-board computing device 113 may automatically delete the biometric information and/or the encryption key in response to a door of autonomous vehicle 102a being unlocked for the rider.

In some non-limiting embodiments or aspects, obtaining the sensor data associated with the environment surrounding the autonomous vehicle assigned to pick-up the rider includes receiving, with remote computing device 110, from autonomous vehicle 102a, the sensor data. For example, remote computing device 110, which may be external to and in wireless communication with autonomous vehicle 102a assigned to pick-up the rider, may remotely process (e.g., process remote from autonomous vehicle 102a, etc.) the sensor data and the biometric information associated with the rider in the biometric identification attempt to identify the rider in the environment surrounding autonomous vehicle 102a assigned to pick-up the rider. As an example, remote computing device 110 may encrypt the biometric information associated with the rider and store (e.g., in database 112, etc.) the encrypted biometric information in association with the rider profile of the rider. As an example, remote computing device 110 may store (e.g., separately store, store in a memory and/or location different than a memory or location in which the encrypted biometric information is stored, etc.) an encryption key for decrypting the encrypted biometric information. In such an example, on-board computing device 113 of autonomous vehicle 102a may encrypt and transmit the sensor data to remote computing device 110. For example, on-board computing device 113 may, in response to determining that autonomous vehicle 102a is within a threshold distance of the pick-up location and/or that a potential rider is attempting to enter the vehicle, begin to capture, encrypt, and/or transmit the sensor data to remote computing device 110 for use in the biometric identification attempt to identify the rider in the environment surrounding autonomous vehicle 102a assigned to pick-up the rider. As an example, remote computing device 110 may receive, from autonomous vehicle 102a and/or user device 150, and/or store an encryption key for decrypting the encrypted sensor data in response to a request for the encryption key sent to on-board computing device 113 and/or user device 150 by remote computing device 110 and/or as part of another communication between remote computing device 110 and on-board computing device 113 and/or user device 150. For example, remote computing device 110 may, in response to identifying the rider and/or determining that the rider is a safe rider, control autonomous vehicle 102a to unlock a door of the autonomous vehicle 102a. In this way, remote computing device 110 may process remote from autonomous vehicle 102a, using the biometric identification technique, the sensor data and the biometric information associated with the rider in the biometric identification attempt to identify the rider in the environment surrounding autonomous vehicle 102a assigned to pick-up the rider. In such an example, remote computing device 110 may automatically delete the sensor data and/or the encryption key in response to a door of autonomous vehicle 102a being unlocked for the rider.

Figure 7:
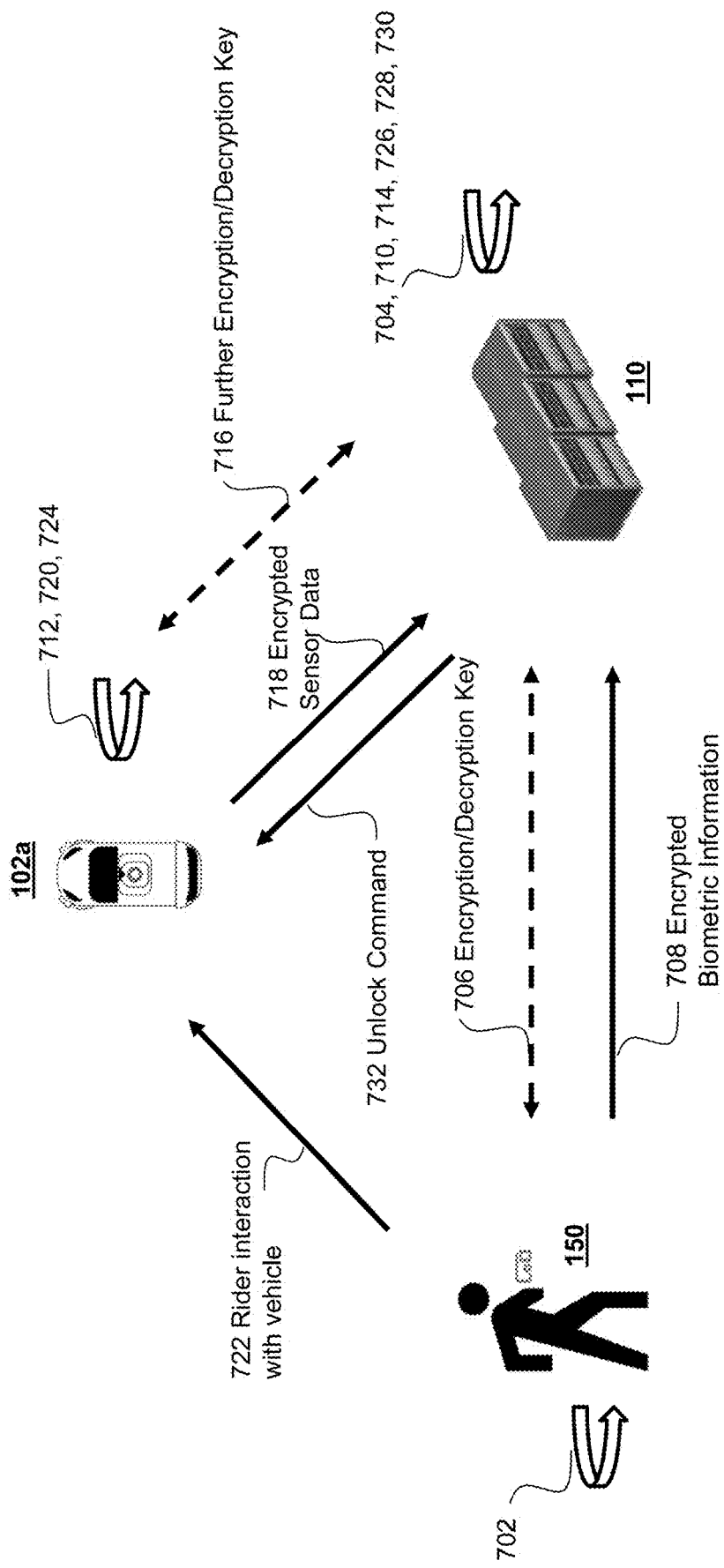
FIG. 7 illustrates encryption/decryption processes for biometric processing within a remote computing device or central server(s).

Referring now to FIG. 7, FIG. 7 illustrates encryption/decryption processes for biometric processing within remote computing device 110 (e.g., a central server(s), etc.). As described herein previously, remote computing device 110 may receive, from user device 150 associated with the user account of the user for the autonomous vehicle service, a pick-up request associated with the rider profile of the rider. Remote computing device 110 may assign an autonomous vehicle to pick-up the rider. For example, autonomous vehicle 102a may receive, from remote computing device 110, a request to pick-up a rider associated with a rider profile of a user account for an autonomous vehicle service. Remote computing device 110 may provide to autonomous vehicle 102a assigned to pick-up the rider, based on the rider profile, an indication of whether biometric identification is to be used to identify the user and/or unlock the autonomous vehicle when picking-up the rider.

As shown in FIG. 7, a pair of keys including an encryption key for generating encrypted biometric information associated with the rider and a decryption key for decrypting the encrypted biometric information associated with the rider may be generated by one of user device 150 (at reference number 702) and remote computing device 110 (at reference number 704). As shown at reference number 706 of FIG. 7, when remote computing device 110 generates the pair of keys, remote computing device 110 may provide, to user device 150, the encryption key, and when user device 150 generates the pair of keys, user device 150 may provide, to remote computing device 110, the decryption key.

As shown at reference number 708 of FIG. 7, remote computing device 110 may receive, from user device 150, the encrypted biometric information associated with the rider. For example, user device 150 may encrypt the biometric information associated with the rider using the encryption key. As shown at reference number 710 of FIG. 7, remote computing device 110 may store, in association with the rider profile of the rider, the encrypted biometric information associated with the rider.

As shown in FIG. 7, a further pair of keys including a further encryption key for generating encrypted sensor data associated with an environment surrounding autonomous vehicle 102a and a further decryption key for decrypting the encrypted sensor data associated with the environment surrounding autonomous vehicle 102a may be generated by one of autonomous vehicle 102a (at reference number 712) and remote computing device 110 (at reference number 714). As shown at reference number 716 of FIG. 7, when remote computing device 110 generates the further pair of keys, remote computing device 110 may provide, to autonomous vehicle 102a, the further encryption key, and when autonomous vehicle 102a generates the further pair of keys, remote computing device 110 may receive, from autonomous vehicle 102a, the further decryption key.

As shown at reference number 718 of FIG. 7, remote computing device 110 may receive, from autonomous vehicle 102a, the encrypted sensor data associated with the environment surrounding autonomous vehicle 102a. For example, as shown at reference number 720 of FIG. 7, autonomous vehicle 102a may obtain sensor data associated with an environment surrounding autonomous vehicle 102a. For example, at least one sensor of autonomous vehicle 102a may capture the sensor data in response to a determination autonomous vehicle 102a is within a threshold distance of the pick-up location and/or in response to a potential rider approaching and/or interacting with the vehicle and provide the sensor data to remote computing device 110. For example, as shown at reference number 722 of FIG. 7, a potential rider may approach and/or interact with autonomous vehicle 102a (e.g., attempt to open a door of autonomous vehicle 102a, etc.). As an example, as shown at reference number 724 of FIG. 7, autonomous vehicle 102a may obtain vehicle location information associated with a location of autonomous vehicle 102a assigned to pick-up the rider.

As shown at reference number 726 of FIG. 7, remote computing device 110 may decrypt, using the decryption key, the encrypted biometric information to obtain the biometric information associated with the rider. As shown at reference number 728 of FIG. 7, remote computing device 110 may decrypt, using the further decryption key, the encrypted sensor data to obtain the sensor data associated with the environment surrounding autonomous vehicle 102a. As shown at reference number 730 of FIG. 7, remote computing device 110 may process, using a biometric identification technique, the sensor data and the biometric information in a biometric identification attempt to identify the rider in the environment surrounding autonomous vehicle 102a, for example, as described in more detail herein with respect to FIG. 6. As shown at reference number 732 of FIG. 7, when the biometric identification attempt identifies the rider in the environment surrounding the autonomous vehicle, remote computing device 110 may, based on identifying the user in the environment surrounding autonomous vehicle 102a with the biometric identification technique, control the autonomous vehicle to unlock a door of autonomous vehicle 102a if the rider profile is approved for automatic entry and/or provide user device 150 associated with the user (e.g., via the software application, etc.) an image of the rider attempting to enter autonomous vehicle (and/or an audio recording of the rider's voice) and a prompt for the user to confirm that autonomous vehicle 102a is to be unlocked for the rider in the image, confirmation of which by the user may unlock the door of autonomous vehicle 102a. For example, autonomous vehicle 102a may receive, from remote computing device 110 and/or user device 150, an unlock command to unlock a door of autonomous vehicle 102a. As an example, in response to receiving the unlock command, autonomous vehicle 102a may unlock the door of autonomous vehicle 102a.

Figure 8:
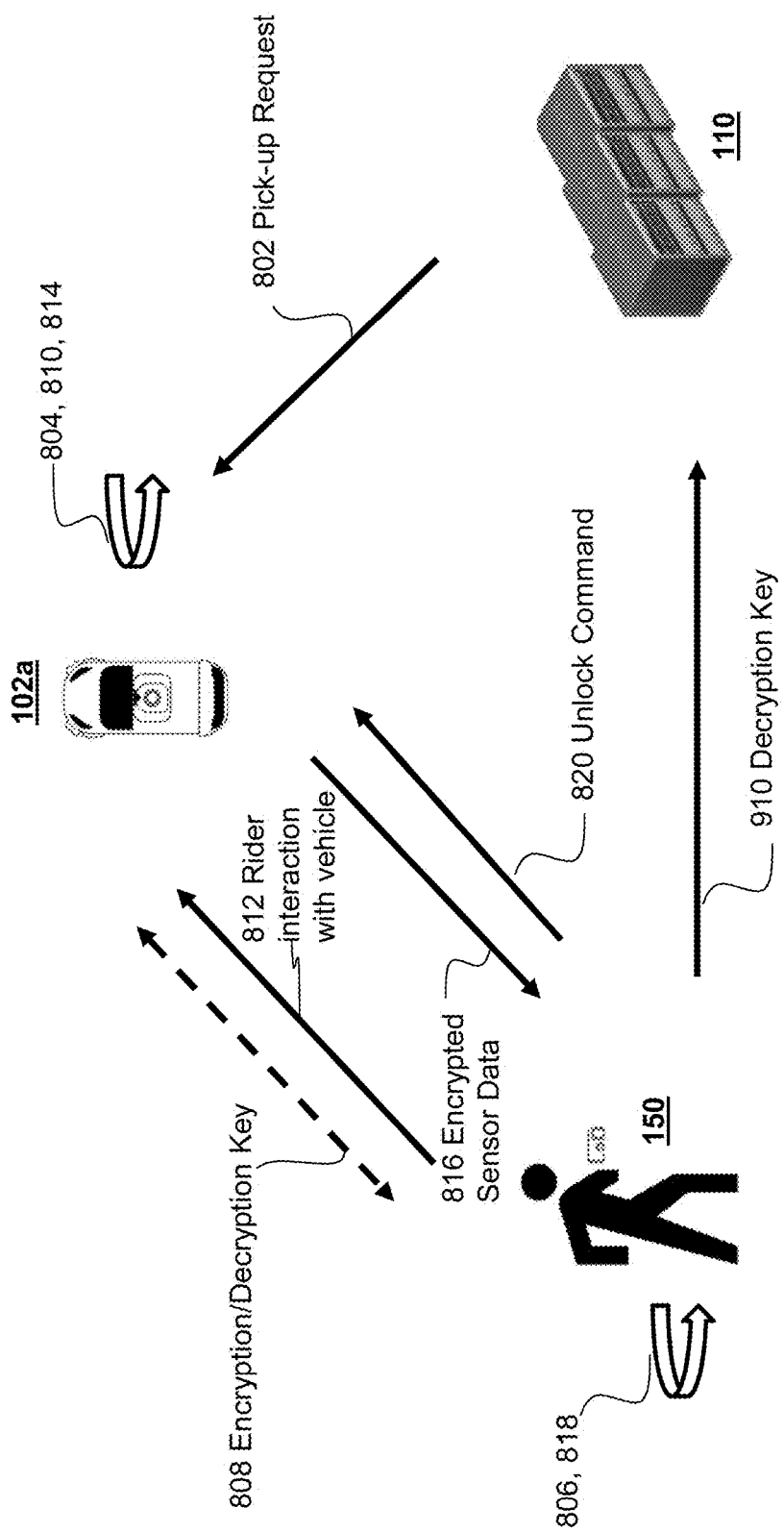
FIG. 8 illustrates encryption/decryption processes for biometric processing within a user device.

Referring now to FIG. 8, FIG. 8 illustrates encryption/decryption processes for biometric processing within user device 150. As shown at reference number 802 of FIG. 8, autonomous vehicle 102a may receive, from remote computing device 110 (e.g., a central server(s), etc.), a request to pick-up a rider associated with a rider profile of a user account for an autonomous vehicle service. As shown in FIG. 8, a pair of keys including an encryption key for generating encrypted sensor data associated with an environment surrounding the autonomous vehicle and a decryption key for decrypting the encrypted sensor data associated with the environment surrounding the autonomous vehicle may be generated by one of (i) autonomous vehicle 102a (reference number 804) and (ii) user device 150 (reference number 806) associated with the user account of the user for the autonomous vehicle service. As shown at reference number 808 of FIG. 8, when autonomous vehicle 102a generates the pair of keys, autonomous vehicle 102a may provide, to user device 150, the decryption key, and when user device 150 generates the pair of keys, autonomous vehicle 102a may receive, from user device 150, the encryption key.

As shown at reference number 810 of FIG. 8, autonomous vehicle 102a may capture, with at least one sensor of autonomous vehicle 102a, the sensor data associated with the environment surrounding the autonomous vehicle 102a. For example, at least one sensor of autonomous vehicle 102a may capture the sensor data in response to a determination that autonomous vehicle 102a is within a threshold distance of the pick-up location and/or in response to a potential rider approaching and/or interacting with the vehicle and provide the sensor data to remote computing device 110. For example, as shown at reference number 812 of FIG. 8, a potential rider may approach and/or interact with autonomous vehicle 102a (e.g., attempt to open a door of autonomous vehicle 102a, etc.). As an example, autonomous vehicle 102a may obtain (e.g., at step 810, 812, etc.) vehicle location information associated with a location of autonomous vehicle 102a assigned to pick-up the rider. In some non-limiting embodiments or aspects, autonomous vehicle 102a may receive, from remote computing device 110, a selection of the one or more types of sensor data to capture, and the at least one sensor may capture the sensor data according to the selection of the one or more types of sensor data.

As shown at reference number 814 of FIG. 8, autonomous vehicle 102a may encrypt, using the encryption key, the sensor data to generate the encrypted sensor data associated with the environment surrounding the autonomous vehicle. As shown at reference number 816 of FIG. 8, autonomous vehicle 102a may provide, to user device 150, the encrypted sensor data associated with the environment surrounding autonomous vehicle 102a. As shown at reference number 818 of FIG. 8, user device 150 may process, using a biometric identification technique, the sensor data and the biometric information in a biometric identification attempt to identify the rider in the environment surrounding autonomous vehicle 102a, for example, as described in more detail herein with respect to FIG. 6. When the biometric identification attempt identifies the rider in the environment surrounding the autonomous vehicle 102a, user device 150 may, based on identifying the user in the environment surrounding autonomous vehicle 102a with the biometric identification technique, control the autonomous vehicle 102a to unlock a door of autonomous vehicle 102a. For example, as shown at reference number 820 of FIG. 8, autonomous vehicle 102a may receive, from user device 150, an unlock command to unlock a door of autonomous vehicle 102a. As an example, in response to receiving the unlock command, autonomous vehicle 102a may unlock the door of autonomous vehicle 102a.

Figure 9:
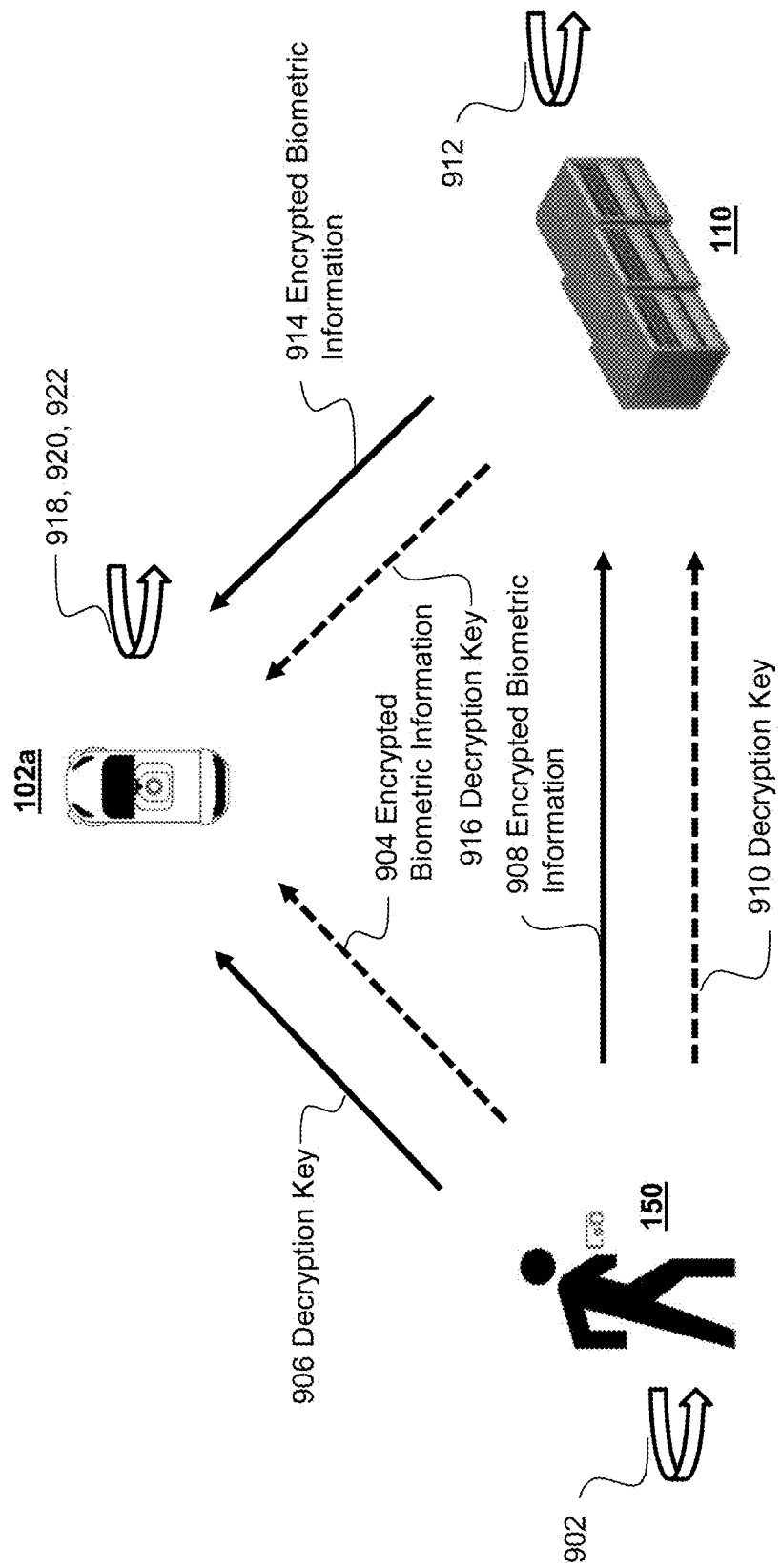
FIG. 9 illustrates encryption/decryption processes for biometric processing within an autonomous vehicle.

Referring now to FIG. 9, FIG. 9 illustrates encryption/decryption processes for biometric processing within autonomous vehicle 102a. As described herein previously, remote computing device 110 may receive from user device 150 associated with the user account of the user for the autonomous vehicle service, the pick-up request associated with the rider profile of the rider and assign autonomous vehicle 102a to pick-up the rider. For example, autonomous vehicle 102a may receive, from remote computing device 110 (e.g., a central server, etc.), the request to pick-up the rider associated with the rider profile of the user account of the user for the autonomous vehicle service. Remote computing device 110 may provide to autonomous vehicle 102a assigned to pick-up the rider, based on the rider profile, an indication of whether biometric identification is to be used to unlock the autonomous vehicle when picking-up the rider.

As shown at reference number 902 of FIG. 9, user device 150 associated with the user account of the user may generate a pair of keys including an encryption key for generating encrypted biometric information associated with the rider and a decryption key for decrypting the encrypted biometric information associated with the rider. For example, the pair of keys may be generated by user device 150 during a generation of the rider profile of the rider for the autonomous vehicle service before providing, to remote computing device 110, the pick-up request associated with the rider profile of the rider. As an example, the pair of keys may be generated by user device 150 based on providing, to remote computing device 110, the pick-up request associated with the rider profile of the rider. In such examples, as shown in FIG. 9, one of (i) the encrypted biometric information associated with the rider (reference number 904) and (ii) the decryption key (reference number 906) may be provided by user device 150 to autonomous vehicle 102a assigned to pick-up the rider in response to user device 150 receiving a request for the decryption key from autonomous vehicle 102a. For example, autonomous vehicle 102a may receive, from user device 150 associated with the user account of the user including the rider profile of the rider, one of (i) the encrypted biometric information associated with the rider (reference number 904) and (ii) the decryption key (reference number 906).

As shown in FIG. 9, remote computing device 110 may obtain from user device 150 associated with the user account of the user including the rider profile of the rider, one of (i) the encrypted biometric information associated with the rider (reference number 908) and (ii) the decryption key (reference number 910).

As shown at reference number 912 of FIG. 9, remote computing device 110 may store, in association with the rider profile of the rider associated with the user account of the user, the one of (i) the encrypted biometric information associated with the rider and (ii) the decryption key. As shown in FIG. 9, remote computing device 110 may provide, to autonomous vehicle 102*a* assigned to pick-up the rider, the one of (i) the encrypted biometric information associated with the rider (reference number 914) and (ii) the decryption key (reference number 916). For example, autonomous vehicle 102*a* may receive, from user device 150 associated with the user account of the user, one of (i) the encrypted biometric information associated with the rider and (ii) the decryption key, and receive, from remote computing device 110, the other of (i) the encrypted biometric information associated with the rider and (ii) the decryption key. For example, the one of (i) the encrypted biometric information associated with the rider and (ii) the decryption key may be obtained by remote computing device 110 during a generation of the rider profile of the rider for the user account of the user for the autonomous vehicle service before receiving, from user device 150 associated with the user account of the user for the autonomous vehicle service, the pick-up request associated with the rider profile of the rider. As an example, the one of (i) the encrypted biometric information associated with the rider and (ii) the decryption key may be obtained by remote computing device 110 based on receiving, from user device 150 associated with the user account of the user for the autonomous vehicle service, the pick-up request associated with the rider profile of the rider.

In some non-limiting embodiments or aspects, the one of (i) the encrypted biometric information associated with the rider and (ii) the decryption key continues to be stored in association with the rider profile or the rider for the user account of the user after the rider is picked-up by the autonomous vehicle. In some non-limiting embodiments or aspects, in response to providing, to the autonomous vehicle assigned to pick-up the rider, the one of (i) the encrypted biometric information associated with the rider and (ii) the decryption key, remote computing device 110 may automatically delete the one of (i) the encrypted biometric information associated with the rider and (ii) the decryption key stored in association with the rider profile of the rider.

As shown at reference number 918 of FIG. 9, autonomous vehicle 102*a* may decrypt, using the decryption key, the encrypted biometric information to obtain biometric information associated with the rider. As shown at reference number 920 of FIG. 9, autonomous vehicle 102*a* may obtain sensor data associated with an environment surrounding the autonomous vehicle, for example, as described in more detail herein with respect to FIG. 6. As shown at reference number 922 of FIG. 9, autonomous vehicle 102*a* may process, using a biometric identification technique, the sensor data and the biometric information associated with the rider in a biometric identification attempt to identify the rider in the environment surrounding autonomous vehicle 102*a* assigned to pick-up the rider, for example, as described in more detail herein with respect to FIG. 6. In such examples, when the biometric identification attempt identifies the rider in the environment surrounding the autonomous vehicle, autonomous vehicle 102*a* may, based on identifying the rider in the environment surrounding autonomous vehicle 102*a* with the biometric identification technique, control autonomous vehicle 102*a* to unlock a door of autonomous vehicle 102*a* if the rider profile is approved for automatic entry and/or provide user device 150 associated with the user (e.g., via the software application, etc.) an image of the rider attempting to enter autonomous vehicle (and/or an audio recording of the rider's voice) and a prompt for the user to confirm that autonomous vehicle 102*a* is to be unlocked for the rider in the image, confirmation of which by the user may unlock the door of autonomous vehicle 102*a*. For example, autonomous vehicle 102*a* may receive from itself and/or user device 150, an unlock command to unlock a door of autonomous vehicle 102*a*. As an example, in response to receiving the unlock command, autonomous vehicle 102*a* may unlock the door of autonomous vehicle 102*a*.

In some non-limiting embodiments or aspects, autonomous vehicle 102*a* may, in response to picking-up the rider, automatically delete (i) the encrypted biometric information associated with the rider and/or (ii) the decryption key stored in association with the rider profile of the rider.

Referring now again to FIG. 6, at step 606, process 600 includes determining whether the rider is identified within a threshold period of time. For example, remote computing device 110 and/or on-board computing device 113 may determine whether the rider is identified in the environment surrounding autonomous vehicle 102*a* is within a threshold period of time (e.g., within a threshold period of time from autonomous vehicle 102*a* arriving at the pick-up location, etc.). As an example, remote computing device 110 and/or on-board computing device 113 may determine whether one or more identification attempts (e.g., a passcode-based technique, a user input-based technique, a biometric identification technique, etc.) identify the rider in the environment surrounding autonomous vehicle 102*a* assigned to pick-up the rider within the threshold period of time.

As shown in FIG. 6, at step 608, process 600 includes, in response to determining that a rider is not identified within a threshold period of time at step 606, notifying a user and/or a rider that a wait time for a pick-up is expired. For example, remote computing device 110 and/or on-board computing device 113 may, in response to determining that the rider is not identified within the threshold period of time, notify the user (e.g., via the software application, etc.) and/or the rider (e.g., via a text message or email to another user device associated with the rider if contact information of the rider is included in the rider profile of the rider, etc.) that a wait time for the pick-up is expired. As an example, remote computing device 110 and/or on-board computing device 113 may, in response to the one or more identification attempts (e.g., a passcode-based technique, a user input-based technique, a biometric identification technique, etc.) failing to identify or confirm the rider in the environment surrounding autonomous vehicle 102*a* assigned to pick-up the rider within the threshold period of time, notify the user and/or the rider that the wait time for the pick-up is expired.

As shown in FIG. 6, at step 610, process 600 includes determining whether a user extends a wait time for a pick-up of a rider. For example, remote computing device 110 may receive, from user device 150 associated with the user account of the user for the autonomous vehicle service (e.g., via the software application, in response to the notification that the wait time for the pick-up of the rider is expired, etc.), an indication of whether the user wants to extend the wait time for the pick-up of the rider.

As shown in FIG. 6, at step 612, process 600 includes, in response receiving an indication that a user does not want to extend a wait time for a pick-up of a rider (or after a timeout of a timer without receiving a response from the user) at step 610, canceling the pick-up of the rider with the autonomous vehicle. For example, remote computing device 110 and/or on-board computing device 113 may, in response to receiving an indication that the user does not want to extend a wait time for the pick-up of the rider (or after a timeout of a timer without receiving a response from the user) cancel the pick-up of the user with autonomous vehicle 102a. In such an example, remote computing device 110 and/or on-board computing device 113 may provide a notification to user device 150 (e.g., via the software application, etc.) and/or the another user device associated with the rider to notify the user and/or the rider that the requested pick-up is canceled.

As shown in FIG. 6, at step 614, process 600 includes, in response to determining that a rider is identified within a threshold period of time at step 606, processing, using an object recognition technique, sensor data associated with an environment surrounding an autonomous vehicle. For example, remote computing device 110 and/or on-board computing device 113 may, in response to determining that the rider is identified within the threshold period of time, process, using an object recognition technique, the sensor data to identify one or more objects in the environment surrounding autonomous vehicle 102a assigned to pick-up the rider. As an example, remote computing device 110 and/or on-board computing device 113 may process, using the object recognition technique, the sensor data to identify one or more predetermined object types (e.g., one or more dangerous objects, such as guns, knives, and/or the like, etc.).

As shown in FIG. 6, at step 616, process 600 includes determining whether a rider is a safe user. For example, remote computing device 110 and/or on-board computing device 113 may determine whether the rider is a safe rider based on the one or more objects identified in the environment surrounding autonomous vehicle 102a. As an example, remote computing device 110 and/or on-board computing device 113 may apply one or more algorithms and/or machine learning models to process the identified objects to determine whether the rider is a safe rider. In some non-limiting embodiments or aspects, remote computing device 110 and/or on-board computing device 113 may automatically determine that a rider is a safe rider in response to the object recognition technique failing to identify one or more predetermined object types and/or may automatically determine that a rider is not a safe rider in response to the object recognition technique identifying one or more predetermined object types.

As shown in FIG. 6, at step 618, process 600 includes, in response to determining that a rider is not a safe rider at step 616, canceling a pick-up of a rider with an autonomous vehicle. For example, remote computing device 110 and/or on-board computing device 113 may, in response to determining that the rider is not a safe rider, cancel the pick-up of the rider with autonomous vehicle 102a.

As shown in FIG. 6, at step 620, process 600 includes, in response to determining that a user is a safe user at step 616, controlling an autonomous vehicle to unlock a door of the autonomous vehicle. For example, remote computing device 110 and/or on-board computing device 113 may, in response to determining that the rider is a safe rider, control autonomous vehicle 102a to unlock a door of autonomous vehicle 102a. As an example, remote computing device 110 and/or on-board computing device 113 may, in response to determining that the rider is a safe rider, control autonomous vehicle 102a to unlock a door of autonomous vehicle 102a that is closest to the rider (e.g., based on identifying the rider in the one or more images relative to autonomous vehicle 102a, based on the door including the fingerprint scanner and/or other input device used to identify the rider, etc.).

Although described in FIG. 6 as dependent on determining that a rider is a safe rider, controlling autonomous vehicle 102a to unlock a door of autonomous vehicle 102a may be performed without such a determination that the rider is safe, for example, directly based on or in response to identifying the rider in the environment surrounding the autonomous vehicle with the one or more identification techniques for automatic or non-automatic entry.

Figure 10:
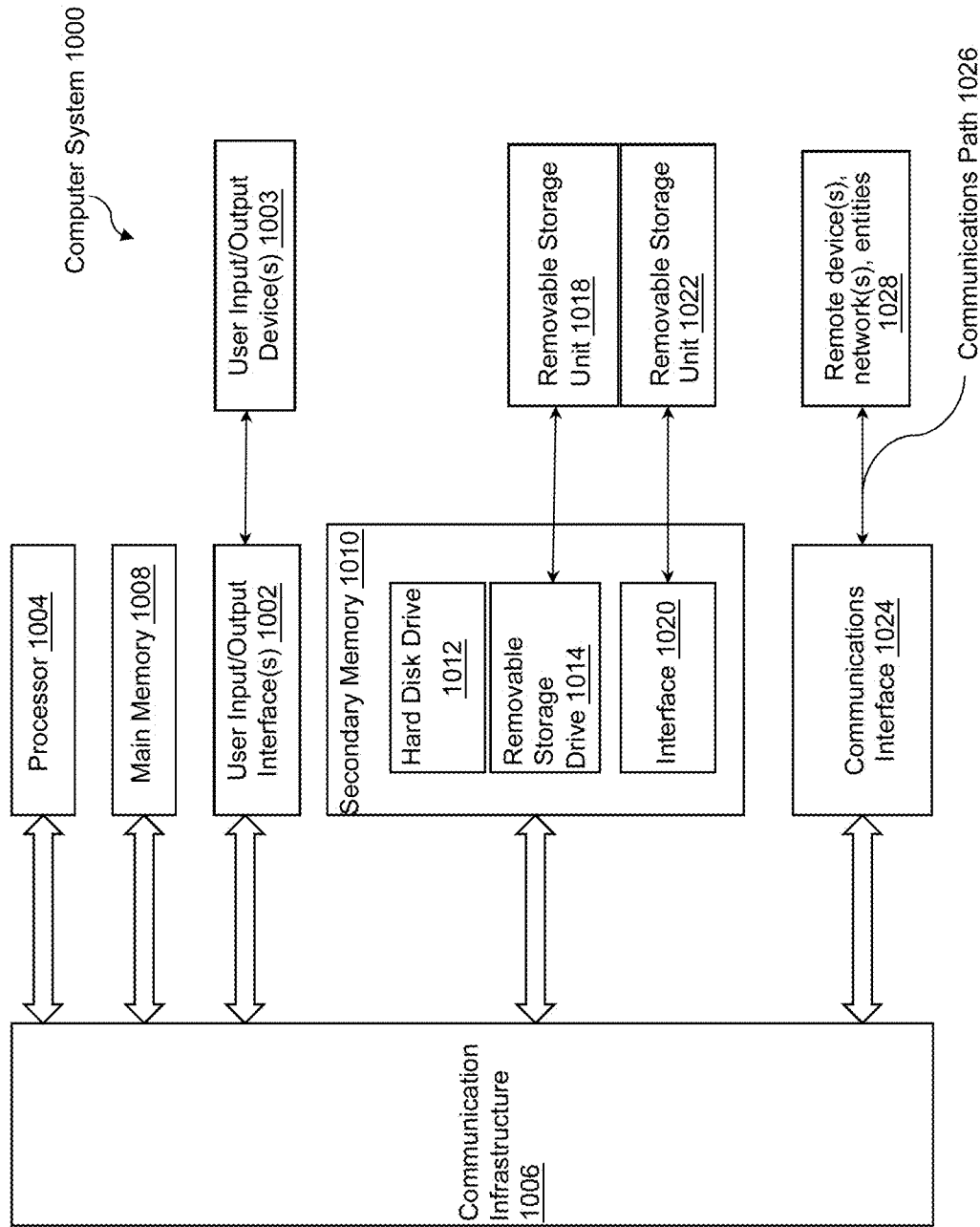
FIG. 10 is an example computer system useful for implementing various embodiments.

Various embodiments can be implemented, for example, using one or more computer systems, such as computer system 1000 shown in FIG. 10. Computer system 1000 can be any computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANS, WANs, the Internet, etc. Control logic and/or data may be transmitted to and from computer system 1000 via communication path 1026.

In an embodiment, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    receiving, with at least one processor, from a user device associated with a user account of a user for an autonomous vehicle service, (i) a request to add a rider profile associated with a rider other than the user to the user account and (ii) rider information associated with the rider;
    generating, with the at least one processor, based on the rider information, the rider profile associated with the rider;
    receiving, with the at least one processor, from the user device associated with the user account, a pick-up request associated with (i) the user account and (ii) the rider profile associated with the rider;
    assigning, with the at least one processor, based on the pick-up request, an autonomous vehicle to pick-up the rider;
    providing, with the at least one processor, to the autonomous vehicle assigned to pick-up the rider, based on the rider profile associated with the rider, an indication of a type of identification to use to identify the rider and/or unlock the autonomous vehicle when picking-up the rider,
    wherein the type of identification to use to identify the rider and/or unlock the autonomous vehicle when picking-up the rider includes at least one biometric identification technique, and wherein a pair of keys including an encryption key for generating encrypted biometric information associated with the rider and a decryption key for decrypting the encrypted biometric information associated with the rider is generated by the user device during the generation of the rider profile of the rider before receiving, with the at least one processor, from the user device, the pick-up request,
    providing, with the at least one processor, to the autonomous vehicle assigned to pick-up the rider, one of (i) the encrypted biometric information associated with the rider and (ii) the decryption key, wherein the other of (i) the encrypted biometric information associated with the rider and (ii) the decryption key is received by the autonomous vehicle assigned to pick-up the rider from the user device, receiving, with the at least one processor, from the user device associated with the user account of the user, a confirmation to unlock the autonomous vehicle for the rider, and providing, with the at least one processor, to the autonomous vehicle assigned to pick-up the rider, based on the confirmation, an unlock command to unlock a door of the autonomous vehicle.

2. The method of claim 1, further comprising:

receiving, with the at least one processor, from the autonomous vehicle assigned to pick-up the rider, at least one of an image of the rider, an audio recording of the rider's voice, or any combination; and providing, with the at least one processor, to the user device associated with the user account of the user, the at least one of an image of the rider, the audio recording of the rider's voice, or any combination; thereof.

3. The method of claim 1, wherein the pair of keys is generated by the user device based on providing, to the at least one processor, the pick-up request associated with the rider profile of the rider.

4. The method of claim 1, wherein one of (i) the encrypted biometric information associated with the user and (ii) the decryption key is provided by the user device to the autonomous vehicle assigned to pick-up the user in response to the user device receiving a request for the decryption key from the autonomous vehicle.

5. The method of claim 1, further comprising:

obtaining, with the at least one processor, from the user device associated with the user account of the user, one of (i) the encrypted biometric information associated with the rider and (ii) the decryption key;

storing, with the at least one processor, in association with the rider profile of the rider, the one of (i) the encrypted biometric information associated with the rider and (ii) the decryption key; and providing, with the at least one processor, to the autonomous vehicle assigned to pick-up the rider, the one of (i) the encrypted biometric information associated with the rider and (ii) the decryption key.

6. The method of claim 5, wherein the one of (i) the encrypted biometric information associated with the rider and (ii) the decryption key is obtained by the at least one processor during generation of the rider profile of the rider before receiving, from the user device associated with the user account of the user for the autonomous vehicle service, the pick-up request associated with the rider profile of the rider.

7. The method of claim 6, wherein the one of (i) the encrypted biometric information associated with the rider and (ii) the decryption key continues to be stored in association with the rider profile of the rider after the rider is picked-up by the autonomous vehicle.

8. The method of claim 5, wherein the one of (i) the encrypted biometric information associated with the rider and (ii) the decryption key is obtained by the at least one processor based on receiving, from the user device associated with the user account of the user for the autonomous vehicle service, the pick-up request associated with the rider profile of the rider.

9. The method of claim 8, further comprising:

in response to providing, to the autonomous vehicle assigned to pick-up the rider, the one of (i) the encrypted biometric information associated with the rider and (ii) the decryption key, automatically deleting, with the at least one processor, the one of (i) the encrypted biometric information associated with the rider and (ii) the decryption key stored in association with the rider profile of the rider.

10. A system, comprising:

a memory; and at least one processor coupled to the memory and configured to:

receive, from a user device associated with a user account of a user for an autonomous vehicle service, (i) a request to add a rider profile associated with a rider other than the user to the user account and (ii) rider information associated with the rider;

generate, based on the rider information, the rider profile associated with the rider;

receive, from the user device associated with the user account, a pick-up request associated with (i) the user account and (ii) the rider profile associated with the rider;

assign, based on the pick-up request, an autonomous vehicle to pick-up the rider;

provide, to the autonomous vehicle assigned to pick-up the rider, based on the rider profile associated with the rider, an indication of a type of identification to use to identify the rider and/or unlock the autonomous vehicle when picking-up the rider, wherein the type of identification to use to identify the rider and/or unlock the autonomous vehicle when picking-up the rider includes at least one biometric identification technique, and wherein a pair of keys including an encryption key for generating encrypted biometric information associated with the rider and a decryption key for decrypting the encrypted biometric information associated with the rider is generated by the user device, and wherein the pair of keys is generated by the user device during the generation of the rider profile of the rider before receiving, with the at least one processor, from the user device, the pick-up request;

provide, to the autonomous vehicle assigned to pick-up the rider, one of (i) the encrypted biometric information associated with the rider and (ii) the decryption key, wherein the other of (i) the encrypted biometric information associated with the rider and (ii) the decryption key is received by the autonomous vehicle assigned to pick-up the rider from the user device;

receive, from the user device associated with the user account of the user, a confirmation to unlock the autonomous vehicle for the rider; and provide, to the autonomous vehicle assigned to pick-up the rider, based on the confirmation, an unlock command to unlock a door of the autonomous vehicle.

11. The system of claim 10, wherein the at least one processor is further configured to:

receive, from the autonomous vehicle assigned to pick-up the rider, at least one of an image of the rider, an audio recording of the rider's voice, or any combination thereof; and provide, to the user device associated with the user account of the user, the at least one of an image of the rider, the audio recording of the rider's voice, or any combination thereof.

12. The system of claim 10, wherein one of (i) the encrypted biometric information associated with the user and (ii) the decryption key is provided by the user device to the autonomous vehicle assigned to pick-up the user in response to the user device receiving a request for the decryption key from the autonomous vehicle.

13. The system of claim 10, wherein the at least one processor is further configured to:
   obtain, from the user device associated with the user account of the user, one of (i) the encrypted biometric information associated with the rider and (ii) the decryption key;
   store, in association with the rider profile of the rider, the one of (i) the encrypted biometric information associated with the rider and (ii) the decryption key; and
   provide, to the autonomous vehicle assigned to pick-up the rider, the one of (i) the encrypted biometric information associated with the rider and (ii) the decryption key.

14. The system of claim 13, wherein the one of (i) the encrypted biometric information associated with the rider and (ii) the decryption key is obtained by the at least one processor during generation of the rider profile of the rider before receiving, from the user device associated with the user account of the user for the autonomous vehicle service, the pick-up request associated with the rider profile of the rider, and wherein the one of (i) the encrypted biometric information associated with the rider and (ii) the decryption key continues to be stored in association with the rider profile of the rider after the rider is picked-up by the autonomous vehicle.

15. The system of claim 14, wherein the one of (i) the encrypted biometric information associated with the rider and (ii) the decryption key is obtained by the at least one processor based on receiving, from the user device associated with the user account of the user for the autonomous vehicle service, the pick-up request associated with the rider profile of the rider, and wherein the at least one processor is further configured to:
   in response to providing, to the autonomous vehicle assigned to pick-up the rider, the one of (i) the encrypted biometric information associated with the rider and (ii) the decryption key, automatically delete the one of (i) the encrypted biometric information associated with the rider and (ii) the decryption key stored in association with the rider profile of the rider.

* * * * *